United States Patent [19]
Robinson

[11] Patent Number: 5,842,218
[45] Date of Patent: Nov. 24, 1998

[54] METHOD, COMPUTER PROGRAM PRODUCT, AND SYSTEM FOR A REORIENTING CATEGORIZATION TABLE

[75] Inventor: Marke James Robinson, Belmont, Mass.

[73] Assignee: Media Plan, Inc., Sandy, Utah

[21] Appl. No.: 761,592

[22] Filed: Dec. 6, 1996

[51] Int. Cl.$^6$ .............................. G06F 17/00; G06F 17/30
[52] U.S. Cl. ................................ 707/102; 707/514; 707/7
[58] Field of Search ..................................... 707/100–104, 707/1–206, 500–542; 364/DIG. 1; 395/200.6–200.69; 704/8, 9

[56] References Cited

U.S. PATENT DOCUMENTS

| | | | |
|---|---|---|---|
| 4,991,094 | 2/1991 | Fagan et al. ........................ | 364/DIG. 1 |
| 5,165,021 | 11/1992 | Wu et al. ............................. | 395/200.63 |
| 5,444,615 | 8/1995 | Bennett et al. .......................... | 707/500 |

*Primary Examiner*—Thomas G. Black
*Assistant Examiner*—David Yiuk Jung
*Attorney, Agent, or Firm*—Workman, Nydegger & Seeley

[57] ABSTRACT

A method computer program product, and system for a reorienting categorization table is provided. A control interface is used to select the hierarchy of categorization levels for a categorization table into a quantity of data records. Once the user selects the desired hierarchy, the categorization table will reorient itself into the chosen categorization level hierarchy with the records in their appropriate locations. This allows more flexibility and a more efficient mechanism for putting the data into a desired organization. The user may reorient the categorization table as desired using the control interface. This invention finds particular usefulness in a database browser wherein the database is queried for potential records according to both a desired categorization level hierarchy and constraints on the potential categorization level values within one or more of the categorization levels. In effect, this filters the records so that a selection categorization table (capable of reorientation) is created with a manageable number of pertinent and relevant data records indicated therein from the results of the query. From there, records are selected to be placed in a retrieval categorization table (also capable of reorientation). Record references may be switched back and forth between the selection categorization table and the retrieval categorization table until a final set of references indicating desired records is attained. The references for the final set of records is used to make the actual record retrieval for processing each of the entire records or a portion thereof.

12 Claims, 19 Drawing Sheets

RECORD CATEGORIZATION LEVELS
(Many Records)

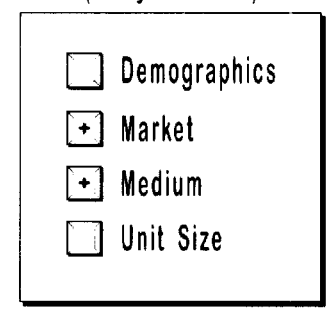

- Demographics
- [+] Market
- [+] Medium
- Unit Size

124d

130 Query 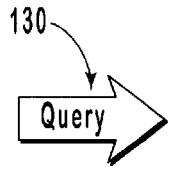

SELECTION CATEGORIZATION TABLE
(Fewer Records)

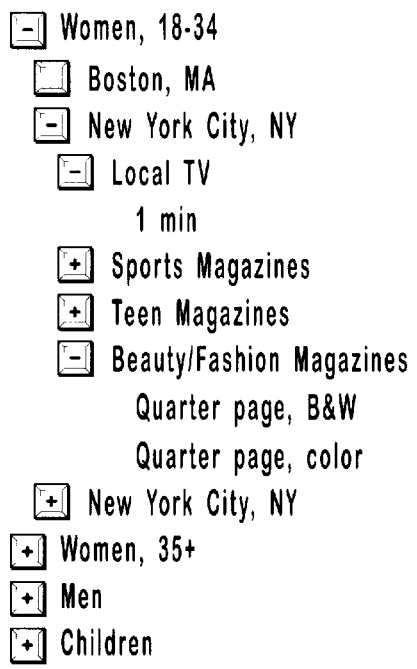

- [−] Women, 18-34
  - Boston, MA
  - [−] New York City, NY
    - [−] Local TV
      - 1 min
    - [+] Sports Magazines
    - [+] Teen Magazines
    - [−] Beauty/Fashion Magazines
      - Quarter page, B&W
      - Quarter page, color
  - [+] New York City, NY
- [+] Women, 35+
- [+] Men
- [+] Children 126c

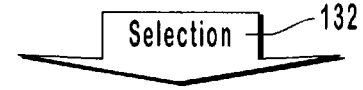
Selection — 132

RETRIEVAL
CATEGORIZATION TABLE    (6 RECORDS)

- [−] Women, 18-34
  - [+] Boston, MA
  - [−] New York City, NY
    - [−] Local TV
      - 15 sec
      - 30 sec
    - [−] Beauty/Fashion Magazines
      - Full page, B&W
      - Full page, color 128b

METHOD, COMPUTER PROGRAM PRODUCT, AND SYSTEM FOR A REORIENTING CATEGORIZATION TABLE

BACKGROUND OF THE INVENTION

1. The Field of the Invention

The present invention relates to methods of viewing a quantity of data records in an organized fashion so as to enable location of desired data. More particularly, the present invention relates to categorization tables for selectively viewing a quantity of data records. Furthermore, the present invention relates to methods for providing a database navigation interface that allows a user to query the database and selectively retrieve desired database records for processing.

2. Present State of the Art

Computer databases of electronic information are now common in many contexts. Such databases may be as simple as few data records internal to an application program to complex distributed databases containing millions of records. The electronic information typically arranged as individual data records is used to store many types and varieties of useful data. Throughout this application, examples will be drawn to databases having data records composed of media pricing and rating table information ("PART" data) that is useful to advertising planners in creating overall advertising campaigns. Naturally, the present invention and it's relevant application can be used with respect to any type of database.

When navigating through ever increasing amounts of data, computer users typically manage and find particular data objects or records by mechanisms using the computer display. Such mechanisms will visually display the data objects or records in some form of organized, often hierarchial, fashion. Furthermore, a user is often able to manipulate the display mechanism in order to select objects for appropriate actions (starting a program, printing a file, etc.).

More advanced organizational systems will allow the user to change the way the objects or other information is viewed in order to focus in on relevant information amidst the vast quantities of potentially viewable information. From the rudimentary "dir" command in the DOS operating environment, which allows a user to search for files in a file system, to complex and robust GUI file navigation systems, which allow custom tailoring of directory hierarchy to suit the purposes of the user, many different visual systems have been devised for navigating a computer file system. Likewise, a number of systems exist for navigating any collection of data records forming a database.

One common system found in a variety of hardware/software computer systems and applied in a variety of different contexts is the categorization table. A categorization table organizes data under successive and expandable levels of categorized headings. Such headings give relevant information to the user as to the nature of the underlying subheadings and/or data grouped under particular headings at a given level.

Initially, the category level one headings will be visible on the display means in the "collapsed" state—a state where no subheadings or data entries are listed. If a particular top-level (level one) heading is "expanded" a number of category subheadings (level two) are displayed, often indented or otherwise distinguished, underneath the expanded top-level heading. Further, depending on the number of successive levels, there may be successive groups of indented subheadings until the actual desired information is listed under the deepest subheading and data may appear under any pertinent heading or subheading. Whether a heading or subheading is "expanded" or "collapsed" is typically, but not necessarily, indicated by a plus symbol "+" (collapsed) or a minus symbol "−" (expanded) located in a small box adjacent to the heading or subheading.

By interacting with the categorization table, a user may create a customized "view" into the quantity of data records with the most relevant data being displayed under expanded headings and subheadings while non-relevant data remains unseen under the upper or top level headings. Furthermore, a categorization table may be displayed within a scrollable display window located within the computer display when the entire categorization table is unable to be displayed within the confines of the window boundaries.

The categorization table as presently used suffers from being somewhat inflexible due to the arbitrary nature of the organizational hierarchy of the various categorization levels. For example, a user typically must work within the framework of the category levels and their hierarchy as chosen by the table designer and this may not allow the data to be viewed in the most optimal way of viewing the data according to the users desire. What is needed is a convenient way to add the ability to change the hierarchy of categorization levels so that a user may customize the categorization tables' orientation with respect to a quantity of data records in order to view and organize data in the desired manner from the perspective of the user.

A categorization table sometimes has limitations when the sheer quantity of data records make the categorization table impractical. When accessing large databases of information, there are currently many ways of viewing the database contents so that a user may identify desired data records to be processed in some fashion. One way is to query the database according to a certain criteria and receive a set of data records, much smaller in number than the than the number of records in the entire database. This allows the user to view or search through a smaller quantity of records in order to identify the desired records for processing. Developing proper database queries and searching the database can be very difficult when the number of data records is very large. Therefore, it is desirable to make iterative queries until a relatively manageable set of relevant database records, record references, or partial records is attained that can displayed in visual format and scanned by a user to quickly locate those records desired for processing.

When the data base is physically located far away from the user in a distributed environment, retrieving large quantities of data records can be prohibitively "expensive" in terms of the retrieval overhead such as communication medium bandwidth, client system resources for managing records, etc. A database query may return record references or only part of the information that the user can view in order to determine whether the record is desired for processing. Only those records that are truly desired for processing should actually be retrieved from the database in order to have an efficient system.

What is needed is a way to interact with a database of data records that allows a client to quickly perform a query followed by viewing the queried results in a categorization table format that is itself customizable according to user needs so that a relevant subset of the data records in the query set may be selected for actual retrieval and processing. This would increase the speed at which a user may traverse a very large database to find those elements that are most pertinent for processing and would do so in an efficient manner that would not create an undue bandwidth burden or other forms of retrieval overhead.

SUMMARY AND OBJECTS OF THE INVENTION

It is an object of the present invention to provide a flexible way of viewing a quantity of data records that may be customized according to the needs and desires of the user.

It is another object of the present invention to be used in viewing a query result set of data records, references to data records, or partial data records so that particular records may be identified for processing.

It is a further object of the present invention to allow user selection of the hierarchy of categorization levels for a categorization table so that the categorization table may dynamically "reorient" the categorization level hierarchy according to the user selected hierarchy to allow different user organization into the same data records.

Additional objects and advantages of the invention will be set forth in the description which follows, and in part will be obvious from the description, or maybe learned by the practice of the invention. The objects and advantages of the invention may be realized and obtained by means of the instruments and combinations particularly pointed out in the appended claims.

To achieve the foregoing objects, and in accordance with the invention as embodied and broadly described herein a method and computer program product for reorienting a categorization table into a quantity of data records is provided.

A user will see displayed the different categorization levels used in a particular categorization table into a quantity of data records and organized in a given hierarchy. From this information, the user may select the desired hierarchy of the categorization levels. One way to do this is to display the categorization level title in a GUI window with the hierarchy determined by rank order of the titles. A user may then use a mouse or other pointing device to "drag" the categorization level titles into the desired hierarchy.

Once the hierarchy of categorization levels has been selected, the categorization table will "reorient" to the new hierarchy of categorization levels. In other words, a given data record will be located in a different hierarchal path of expanded levels. This allows a user to organize the data using hierarchal categorization levels that are most useful.

The reorientation may occur dynamically or may be user initiated by depressing a GUI button. Furthermore, various embodiments may allow categorization levels to be omitted or added to further provide a customizable way of viewing a quantity of data records in an organized fashion.

On embodiment of the present invention is used as part of a database record browser so that only desired records are actually retrieved. In this embodiment, a database is accessed and a number of categorization levels are shown. Furthermore, one or more of the categorization levels may be organized to have a subheadings to subdivide the potential values of the given categorization level. The purpose of such subdivision is to allow the user to "filter" the categorization table values for each applicable categorization level.

Not only does the filtering of the categorization level values reduce the size and complexity of the categorization table, the selected categorization level values are also used as limiting criteria in making a database query. The result set of records fitting the described query are then organized and viewed in categorization table format according to the user selected categorization level hierarchy. It may be noted that the entire set of records is not retrieved, just that portion used to make the categorization table. In this manner, only that minimum amount of information is retrieved from the database to make a useful categorization table having a manageable number of entries according to user desire.

From this categorization table, particular records may be selected for further processing. As such records are selected, they are removed from the "selection" categorization table and organized into a second "retrieval" categorization table. In this embodiment, retrieval occurs as a result of explicit user action (e.g., by depressing a GUI button) but other embodiments may have retrieval automatically occur.

A feature of the browser as implemented is the ability to reorient the selection and retrieval categorization tables at will during the record selection process. The hierarchy of the categorization levels may be changed at any time to assist the user in finding the desired data records for retrieval. This allows a much more flexible mechanism for "browsing" the database for desired data records and results in greater ease and efficiency to the user in finding and selecting data records for processing.

These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawing depict only typical embodiments of the invention and are not therefore to be considered to be limiting of its scope, the invention will be described and explained with additional specificity and detail through the use of the accompanying drawings in which:

FIG. 1A represents the data records sorted on fields "A," "B," and "C. " FIG. 1B shows a control interface listing the category level titles that may be rearranged. FIG. 1C represents a categorization table into the data records of 1A with the category levels determined by the rank ordering of the category level title in FIG. 1B.

FIG. 2A is the same set of data records as FIG. 1A sorted on fields "B," "C," and "A. " FIG. 2B is a control interface showing the change in the order of category levels from that shown in FIG. 1B. FIG. 2C is the "reoriented" categorization table into the same set of data records according to the category levels indicated by the control interface FIG. 2B.

FIGS. 7–10 illustrate the use of the reorienting categorization table of the present invention as implemented in a data base browser and retrieval mechanism for interacting with a database of advertising media pricing and rating table information ("PART data").

FIG. 7 shows a control interface having four categorization levels as it would appear before and after a user changes the categorization level hierarchy or order.

FIG. 8 shows the expanded control interface of FIG. 7 in expanded form with selections being made in the market categorization level and the medium categorization level and a reorienting categorization table based on a query of the selected categorization levels. Furthermore, the selection categorization table indicates fewer records then the many records contained in the database due to a "filtering"election made in the control interface.

FIG. 9 shows the control interface and selection categorization table of FIG. 8 with an additional categorization table for viewing the records selected for retrieval.

FIG. 10 shows the control interface, the selection categorization table, and the retrieval categorization table of FIG. 9 as they appear when the control interface is used to change the categorization level hierarchy so that the selection categorization table and the retrieval categorization table reorient to reflect such change.

FIGS. 11–16 are screen shots forming Example A that illustrate various aspects of operation of the present invention using a particular user interface.

DETAILED DESCRIPTION OF THE PREFERRED EMBODIMENTS

As used herein, the term "data record" indicates an identifiable and retrievable portion of data usually having at least one defined data record field. This definition includes, but is not limited to, database records, e-mail messages, files in a file system, objects in a directory, data in a computer memory, etc. Data records that are referenced as part of an index or categorization table need not be in the same uniform database or be of equal format (e.g., type or size) but must have common fields for sorting.

Figure 1:
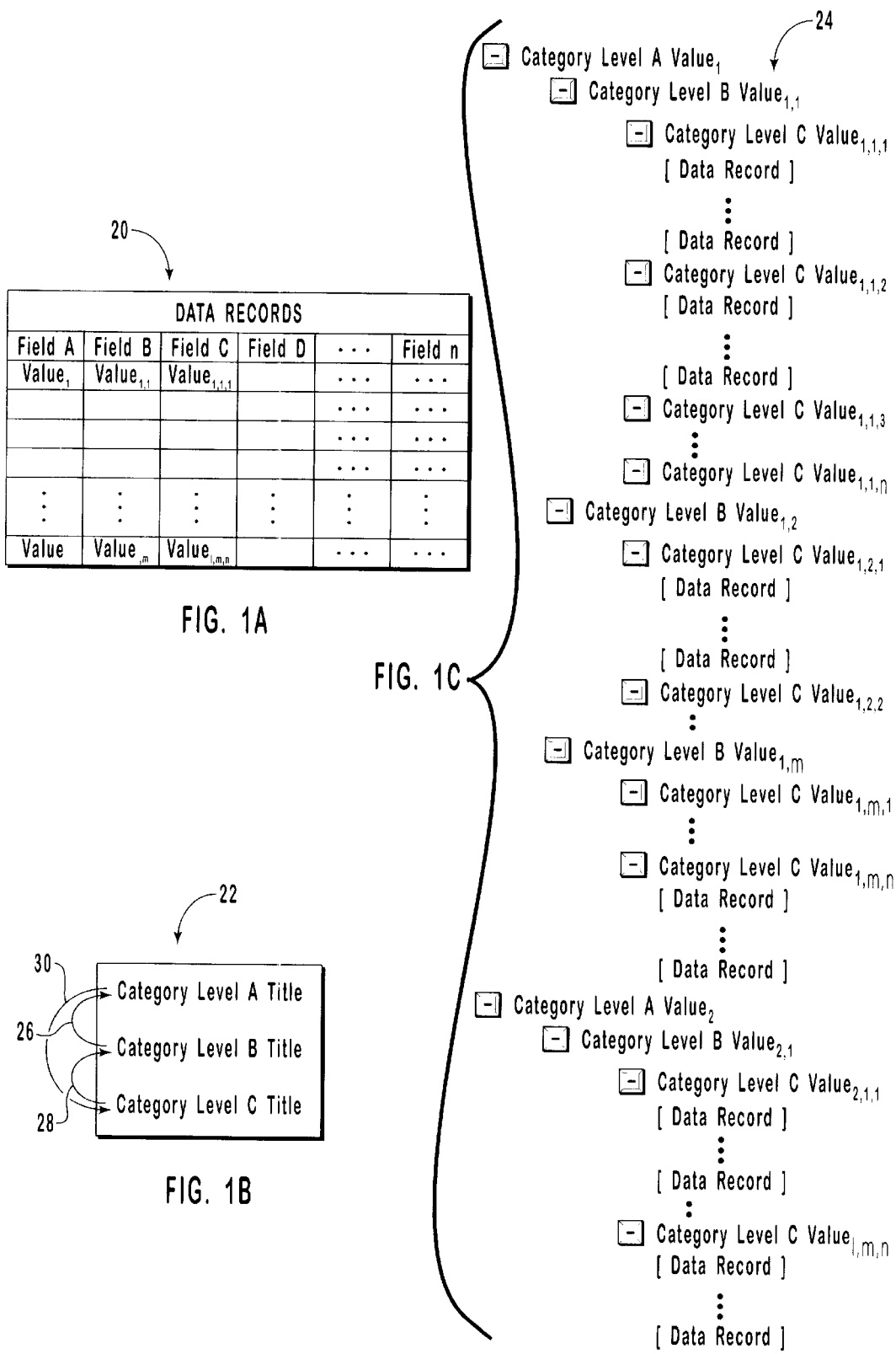
FIGS. 1A, 1B, and 1C together illustrate a categorization table into a collection of data records.

Referring now to FIG. 1A, a set of sorted data records 20 is illustrated. The data records of FIG. 1A are sorted across field A, field B, and field C. The values contained in a given row have subscripts that indicate their position within the sort. For example, values in the data record row for field A are listed from subscript one through l where like subscript values indicate like actual values.

For the values in the data record rows as shown in FIG. 1A for the field B, contain two subscripts separated by a comma. The first subscript will be the same as the corresponding subscript for the value associated with field A, and the second subscript will indicate the actual value of field "B" that corresponds with the actual value of field A. In this manner, the second subscript will be designated for field B ranging from one to m for each associated subscript of field A (e.g., the second subscript will enumerate from one to m for each associated first subscript).

The values for field C follow the same pattern using three subscripts. The first two subscripts indicate the associated values in field A and field B, respectively, while the third subscript ranges from one to n for each value associated with subscripts on field "A" and field B. The actual values for field A, field B, and field C will be used in the categorization table of FIG. 1C as titles for the headings and subheadings.

FIG. 1B shows a control interface wherein the titles of field A, field B, and field C of FIG. 1A are listed as category level A title, category B title, and category level C title, respectively. The control interface 22 as shown in FIG. 1B is used to control the reorienting categorization table hierarchy of different levels. As shown, the top level will be category level A with the various values found in the sorted data records 20 for field A being used as the top level headings of the categorization table 24 shown in FIG. 1C.

Referring now to FIG. 1C, it can be seen that each distinct value of field A of the sorted data records 20 shown in FIG. 1A will correspond to an expandable category level A heading in the reorienting categorization table of FIG. 1C. Likewise, each distinct value of field B of the sorted data records 20 shown in FIG. 1A will correspond to a category level B subheading in the reorienting categorization table 24 of FIG. 1C under the appropriate category level A heading. Correspondingly, the unique values of field C for the sorted data records 20 in FIG. 1A will be the lowest level subheadings for the reorienting categorization table 24 of FIG. 1C.

In order to reorient the reorienting categorization table of FIG. 1C, a user will manipulate the control interface 22 of FIG. 1B to change the order or hierarchy of the categorization levels. This will typically occur as part of some form of graphical user interface ("GUI") such as dragging the different category level titles to the desired positions or using buttons to change their order, or in some other way to achieve the revision of the category level hierarchy. Conceptually, this is shown by arrow 24, arrow 26, and arrow 28, respectively, that manipulate and change the control interface 22 of FIG. 1B so that it appears as shown in FIG. 2B.

Figure 2:
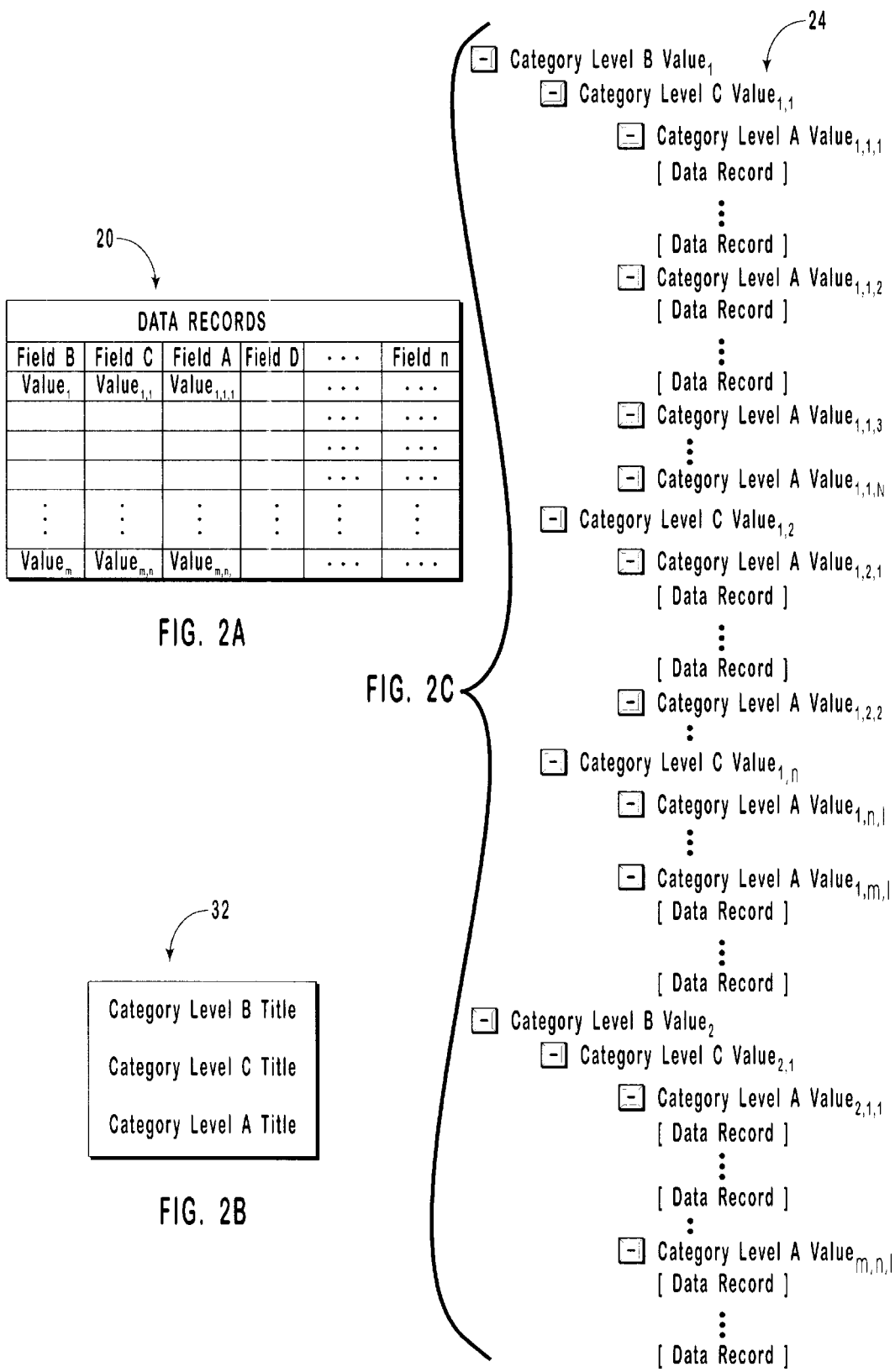
FIGS. 2A, 2B, and 2C together show the reorienting affects of the corresponding element found in FIGS. 1A, 1B, and 1C, respectively.

Referring now to FIGS. 2A, 2B, and 2C, the reorientation of the categorization table 24 will be shown. In response to changing the control interface 22 to the state as shown in FIG. 2B, the data records 20 are resorted according to the new hierarchy. Namely, they are sorted on field B, then field C, and finally on field A as shown in FIG. 2A. Furthermore, the subscripts for the values of the various sorted fields are changed to reflect the new sorting that has occurred.

After sorting, the reorienting categorization table 24 appears as shown in FIG. 2C wherein the category level values are changed to reflect the hierarchy indicated in FIG. 2B and the values are used according to the sorted data records shown in FIG. 2A. Furthermore, actual data records found at the bottom level of the reorienting categorization table 24 of FIG. 2C will be located in a different set of headings and subheadings in the reorienting categorization table 24 of FIG. 2C.

Figure 3:
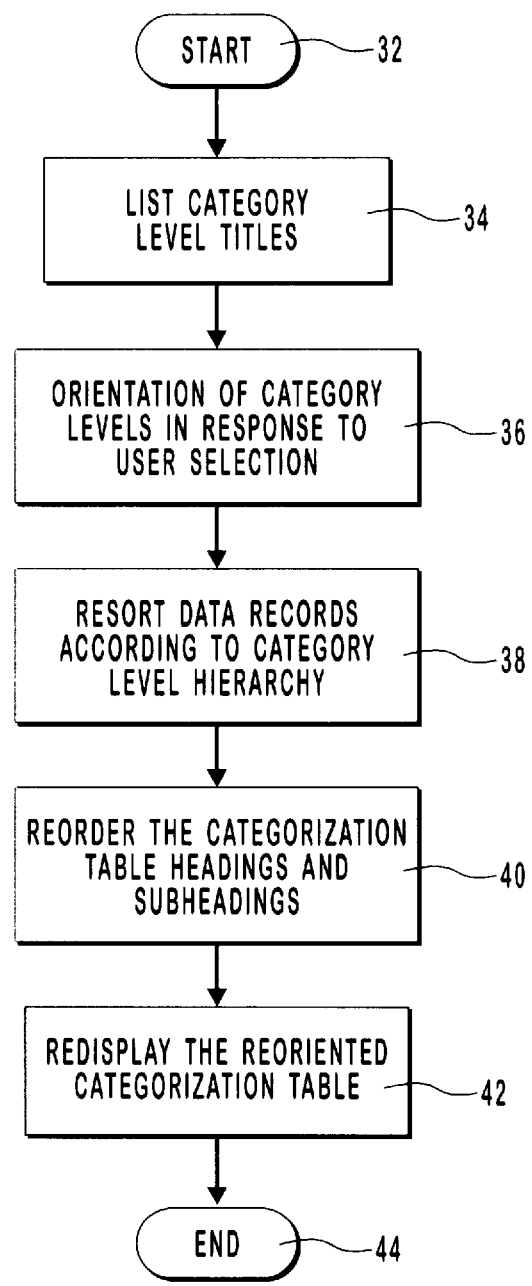
FIG. 3 is a flow chart showing the steps followed by a reorienting categorization table as shown in FIGS. 1A–1C, and 2A–2C.

Referring now to FIG. 3, a flow chart is shown detailing the steps for followed by the reorienting categorization table as shown in FIGS. 1A–1C that will reorient to the state as shown in FIGS. 2A–2C. After starting at step 32, the category level titles are listed in some form of control interface at step 34. The category level titles are typically the field titles in the data records though this is not necessary. There simply need by correspondence of the category levels to the sorting on the actual fields of the data records 20. The user will select the orientation or hierarchy of the category levels at step 36 by manipulating the control interface 22. This represents the transition between the control interface shown in FIGS. 1B and 2B. Again, any form of interface may be used and mechanism for changing the rank ordering or hierarchy category levels but it was likely to occur by means of a GUI wherein the category level titles are dragged or otherwise positioned in their proper order.

The data records 20 are then resorted according to the category level hierarchy selected at step 38. This resorting of the data records 20 is illustrated in the transition of the data records 20 from that shown in FIG. 1A to that shown in FIG. 2A. It may be noted that the sorting mentioned here is a logical sorting and may not require the physical movement of actual records. Many ways are known in the art to accomplish this from special sorting indices and other indirect methods of sorting data records. Furthermore, multiple sorts may exist into the same data records through use of such indirect methods.

Once the resorting is completed, the reorienting categorization table headings and subheading are reordered into the category level hierarchy selected through the control interface using the corresponding field values from the resorted data records in order to create the actual values for the headings and subheadings. Once the reordering of the categorization levels has taken place, the reoriented categorization table 24 may then be redisplayed at step 42 before ending at step 44. Steps 40 and 42 occur using the resorted data records 20 of FIG. 2A and the category hierarchy as shown in the control interface 22 of FIG. 2B to construct and display the categorization table 24 as shown in FIG. 2C.

Figure 4:
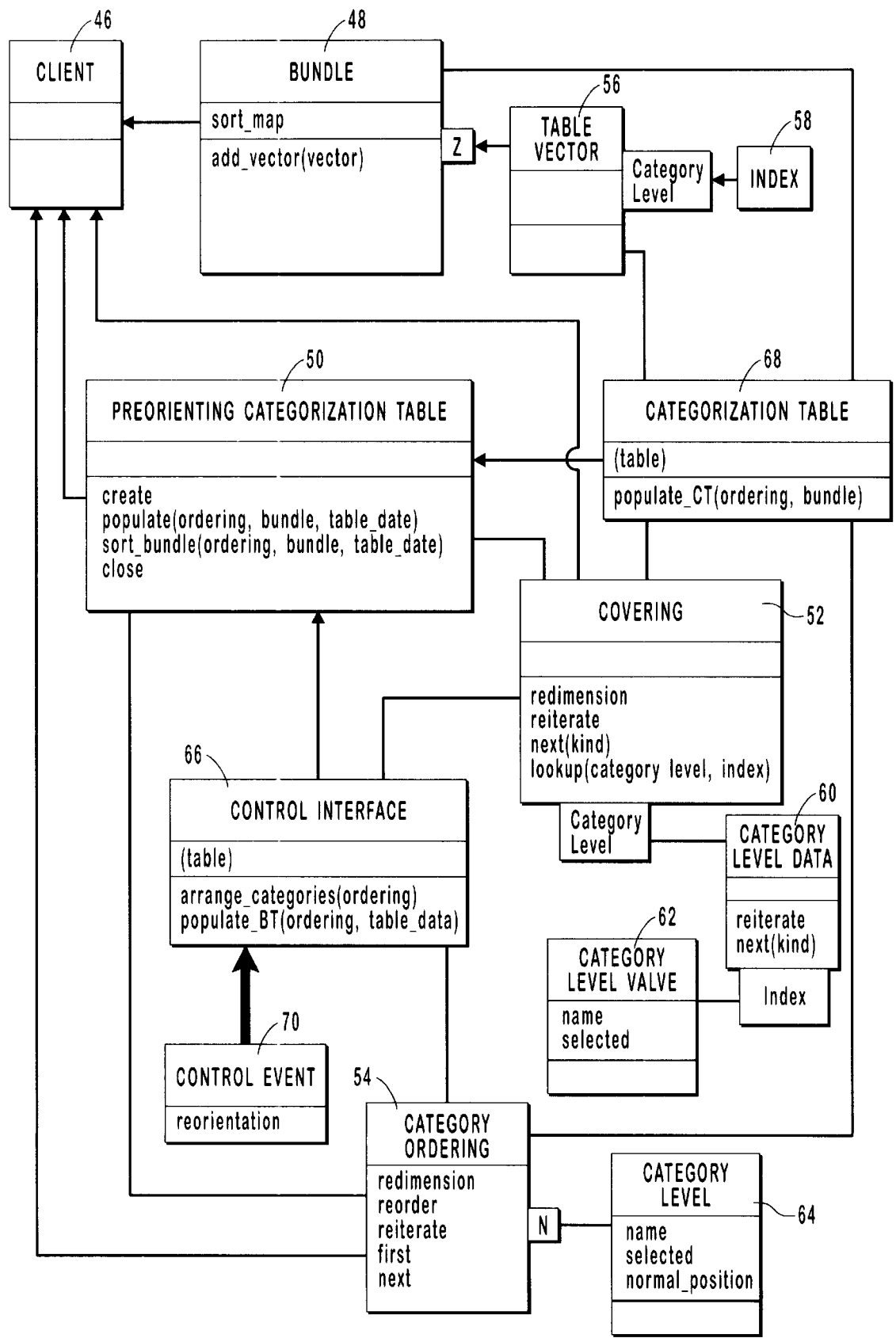
FIG. 4 is an object model interaction diagram showing an underlying implementation of a reorienting categorization table as shown in FIGS. 1A–1C and 2A–2C and following the flow chart as shown in FIG. 3.

Referring now to FIG. 4, one possible software implementation is shown in an object model diagram. A client object 46 will interact with a bundle object 48, the reorienting categorization table object 50, table data object 52, and the category ordering object 54. One important aspect about this object model is that the actual data to be used for the reorienting categorization table is separated from the mechanism for accessing the actual data itself. This separation allows the accessing mechanism to be easily manipulated and to only use the table data when actually creating the reorienting categorization table. Therefore, sorting of data and reordering of category levels may be done quickly and easily without actual manipulation of the string data used for displaying the reorienting categorization table and control interface.

The bundle object 48 represents an index into the data records for all information that will be shown in the categorization table. Included in the bundle object 48 is sorting of the index so that the categorization table may be properly constructed and reoriented. The bundle object 48 will have Z table vector objects 56 associated therewith. Each table vector object 56 represents a record that will be displayed in the reorienting categorization table and each table vector object will have an index object 58 for each category level associated with the object model. In the illustration given in FIGS. 1A–1C and 2A–2C, there would be three category levels therefore this would correspond to three index objects 58 for each table vector object 56. A table vector may be visualized as (1, 1, 1) or (1, 4, 2).

The actual data or records are accessible through the table data object 52. The table data object 52 handles the actual data records or receives information from the data records for creating the heading and subheading in the categorization table. This object has associated with it 3 category level data object 60 for each category level in the model. The category level data object 60 contains all the data for a particular category level that will be used for creating the categorization table headings for that level. By using an index value, typically from a vector object, the actual category level value object 62 may be attained and will have contained therein the string name of the value. It may be noted that the table data object 52 with all the associated table data, may be implemented in part as a two-dimensional array on the category level and index and a vector table may be used for the index values in order to arrive at the desired data strings.

Also accessible to the client is the category ordering object 54 that will have associated therewith N category objects 64. The category ordering object 54 controls the ordering of the different category levels and will change the ordering hierarchy as necessary. The category objects 64 each represent a category level and will have a category level title associated therewith.

The client also interacts with the reorienting categorization table object 50 that will process and control the user interface for a reorienting categorization table. This is done by creating the table, populating the control interface, sorting the bundle based on the category ordering, populating the actual categorization table based on the sorted bundles, and closing the reorienting categorization table.

The reorienting categorization table object achieves this by interacting with the control interface object 66 and the categorization table object 68. The control interface object 66 will arrange the categories for display according to the category ordering object 54 and populate the control interface as seen by the user system. Control interface object will be responsive to control events 70 that are generated by the user operating with the control interface object 66 user interface. While reordering the category hierarchy is illustrated, other events are also contemplated such as selection of categories and some forms of filtering as will be shown in the browser implementation hereafter.

The reorienting categorization table object 50 will also control the display of the categorization table itself through categorization table object 68 in response to the actual category level hierarchies as determined by the control interface object 66. The reorienting categorization table object 50 will populate the categorization table object 68 with the information necessary for displays the proper headings and subheadings.

Figure 5:
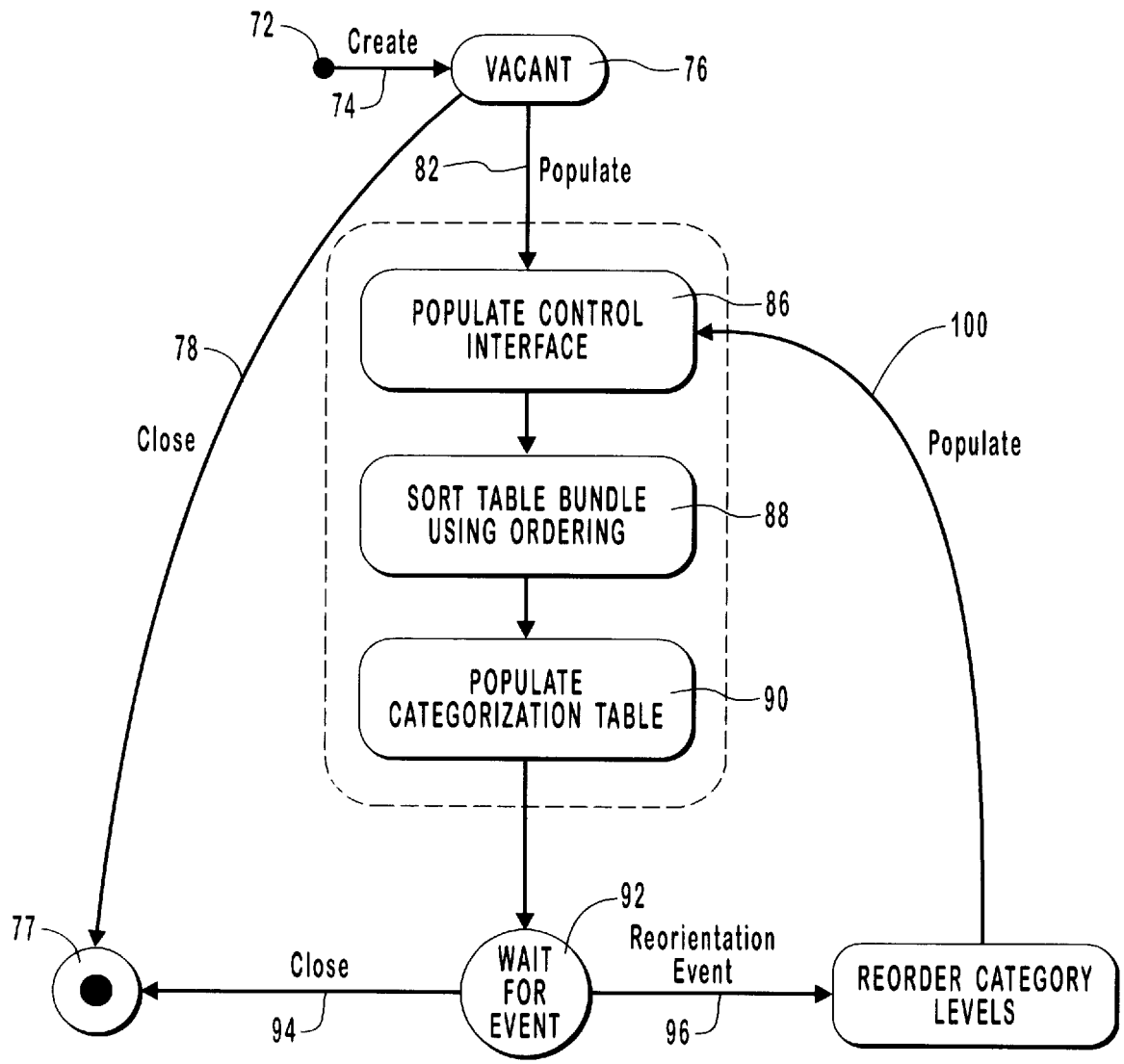
FIG. 5 is an object state diagram corresponding to the object model diagram of FIG. 4.

Referring now to FIG. 5, a state diagram for the object model of FIG. 4 is shown and explained. From beginning point 72, a create operation 74 is executed to arrive at the vacant state 76. Here, the reorienting categorization table is created but does not have any information contained therein. It is possible from this point to do a close operation 78 to arrive at ending point 79.

From the vacant state 76, a populate operation 82 is likely to occur with the steps enclosed in the populate state box 84 being executed in order to initialize the control interface with data representing the different category levels and put in a user interface that will allow reordering of the category level hierarchy. Also, the categorization table is created and displayed according to the category level hierarchy in the control interface as well as the reorienting categorization table itself.

More specifically, the control interface is populated with data at step 86, then the bundle is sorted using category ordering information at step 88 and finally the categorization table is populated with information at step 90 and displayed.

At this point, wait state 92 is entered and a close operation 94 will take the state to ending point 79 while a reorientation event 96 will take the state to the reorder category level state 98. At state 98, categories will be reordered in response to the received event and the user interface will be redisplayed by going through the populate operation 100 and following the steps contained in the population box 84.

Figure 6:
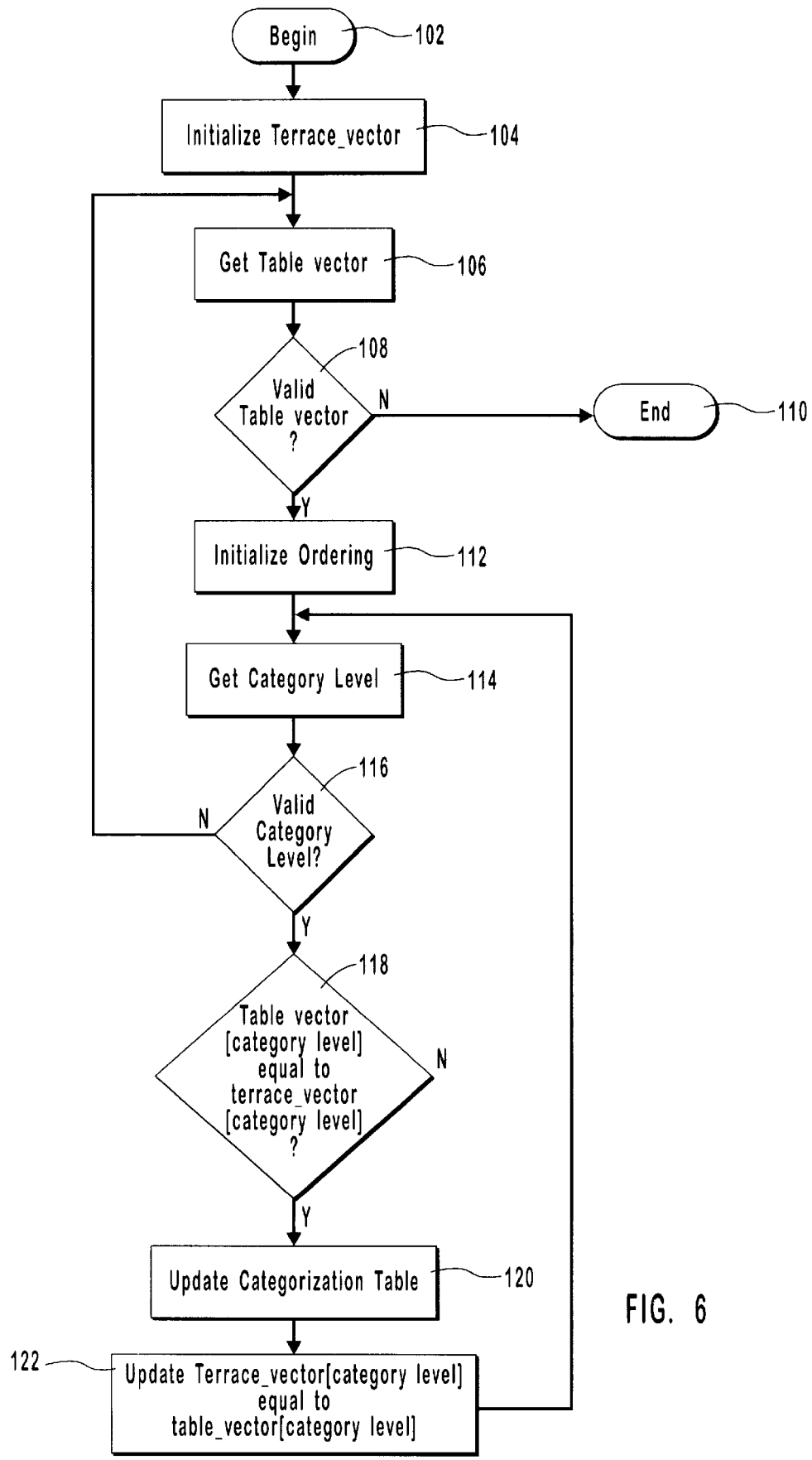
FIG. 6 is a flow chart illustrating the steps taken to populate the categorization table while in the populate state of FIG. 5.

Referring now to FIG. 6, the populate categorization table step 90 of FIG. 5 is explained in greater detail. Beginning at step 102, a special terrace vector is initialized to hold a certain location for each category level at step 104. This terrace vector has the same dimensions in terms of category levels and is used to track whether or not duplicate information is being accessed for placement into the actual categorization table.

A table vector is accessed at step 106 and tested for its validity at step 108. There will be one table vector for each record to be organized in the categorization table, and each table vector will contain an index value, typically an integer, for each category level defined in the categorization table. Essentially, each table vector is processed by traversing through each value therein to determine whether it needs to be used as a heading or subheading. Because there are many duplicate values, only the first value need be used in the actual categorization tables and the rest are duplicates and may simply be passed over. It may be noted that the values spoken of in the vectors are integers and are used for quick comparisons when the actual string value is needed for creation of a categorization table heading or subheading, the vector will be used to index into the table data to locate the corresponding string data value.

If the table vector is invalid (e.g., there are no more table vectors to process), then the processing will end at step 110. Otherwise, an ordering counter would be initialized at step 112 and a category level attained at step 114. The validity of the category level is tested at step 116 with an invalid state typically signifying that there are no more category levels to process for a particular table vector thereby requiring a loop back to step 106 in order to acquire a new table vector.

Assuming valid category level at step 116, a test is made at step 118 to determine whether the value at this particular category level for the table vector is equivalent to the value at this particular category level for the terrace vector. If the values are equal, then this is duplicate information and the processing will loop back to step 114 in order to get the next category level. If the values are different, this signifies that the categorization table needs to use the information found in the table vector at that particular category level to create a heading or subheading. The categorization table is updated using this value at step 120, and this may require using the table vector and category level to access a table data object, a category level data object, and finally, the category level value object that will contain the string information for placement into the categorization table.

At step 122, the terrace vector at this particular category level will be updated to contain the value of the table vector at this particular category level so that duplicates may be omitted in further processing. Finally, upon completion of step 122, the processing loops back to receive another category level at step 114 and the processing continues therewith until all table vectors have been processed through all of the category levels. At that point, the processing will end and the categorization table will be properly oriented and may then be displayed through the user interface.

Figure 7:
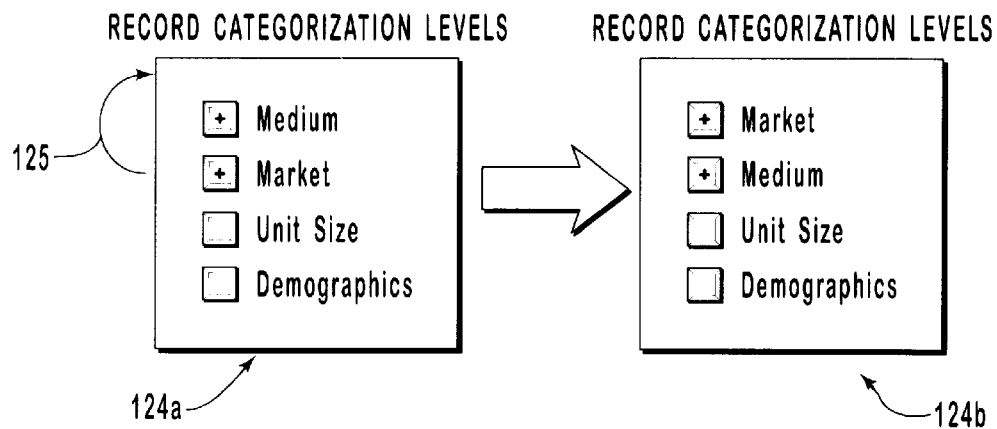

FIGS. 7–10 illustrate the process of using a browser having a reorienting categorization table according to the present invention and will illustrate how the same data may be viewed differently when the categorization table is reoriented. FIG. 7 shows the record categorization levels available in this particular example. Namely, these levels include a particular medium, market, unit size applicable to the medium, and demographic population associated with a price and rating table ("PART") data record that may be found in a data base. Such information is attained upon designating the data base by doing a query on predefined keys. One implementation uses predefined "alias" that are defined in the database to the proper keys so that the browser may be generically implemented and databases may be easily modified to allow the browser access thereto. The PART information is used by media planners as part of an advertising campaign for a particular product or service.

The control interface 124a of FIG. 7 shows the record categorization levels prior to reordering of the categorization hierarchy represented by arrow 125. Once the operation of moving or promoting the market categorization level to the top or upper most level, control interface 124b results. For terms of simplicity, control interface 124a and 124b are the same interface wherein the letter portion of the reference refers to a time sequential change in state. This terminology will also be used with respect to the categorization tables shown hereafter.

Therefore, control interface 124a represents the default or initial condition of the control interface while control interface 124b represents the condition of the control interface after a user has operated thereon using a particular user interface. Throughout the explanation of FIGS. 7–10 reference will be made to actual screen shots for two examples of a graphical user interface illustrating various aspects of operation and showing different mechanisms for causing a control interface to reorient. These actual screen shots are included as Example A (FIGS. 11–16) and Example B (FIGS. 17–22). Example A and Example B utilize the exact same data, have the same browser structure, and only differ in operation of the user interface.

Figure 8:
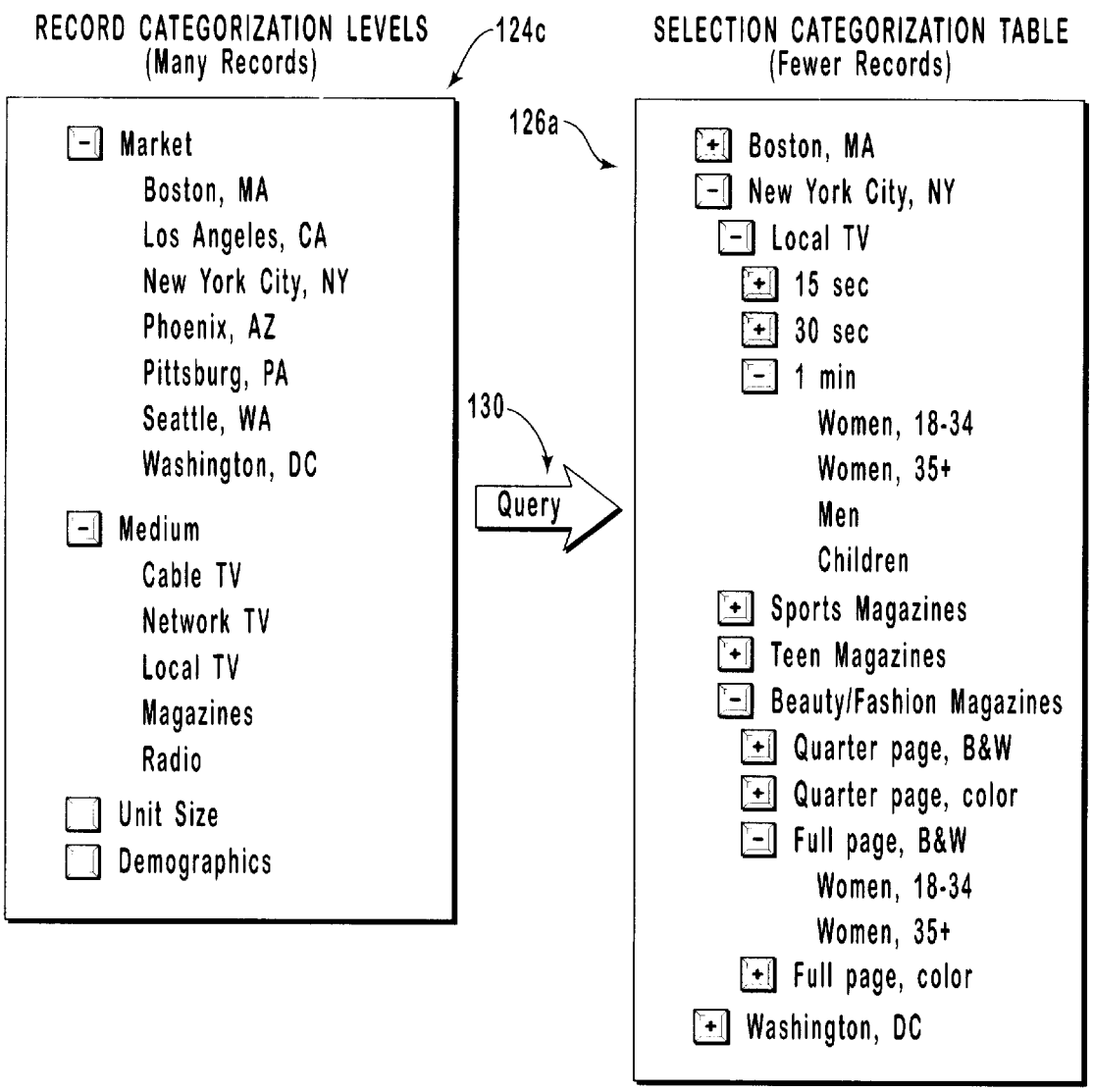
Figure 11:
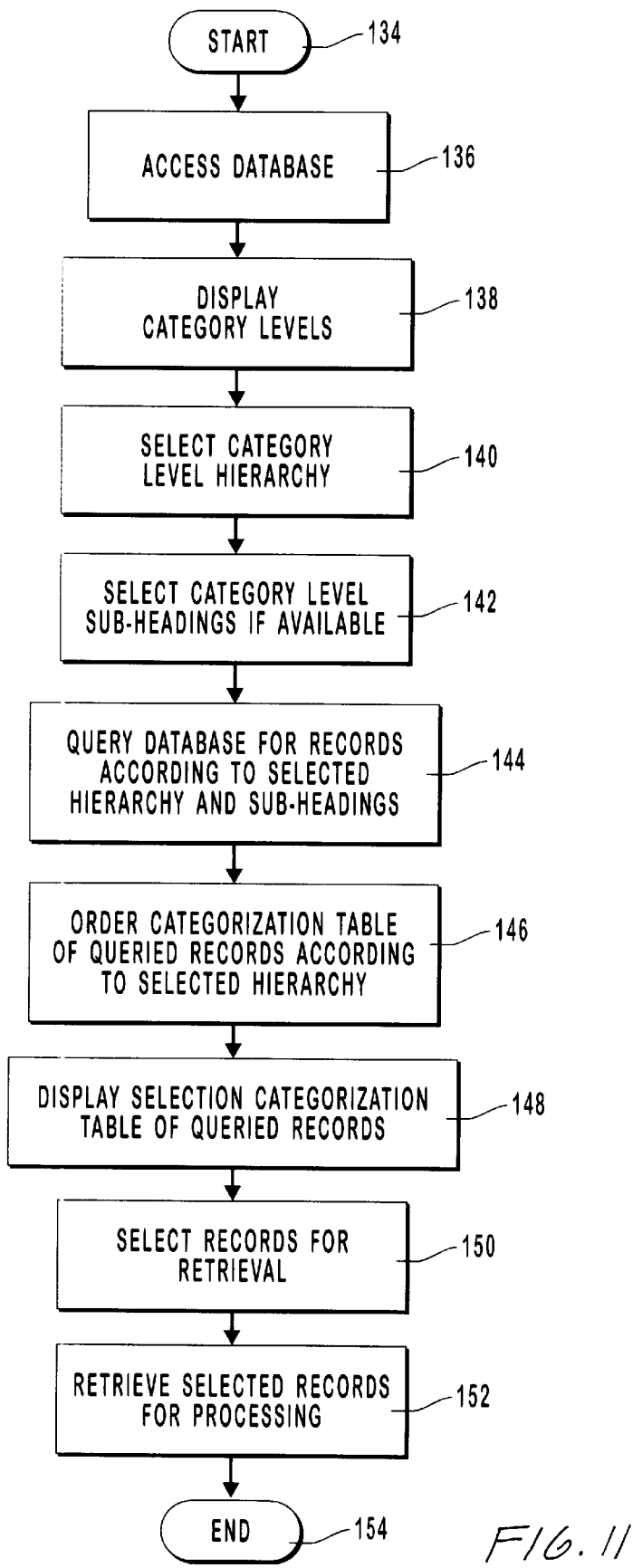
FIG. 11 is a flow chart showing the steps followed by a database browser as shown in FIGS. 7–10.
Figure 11:
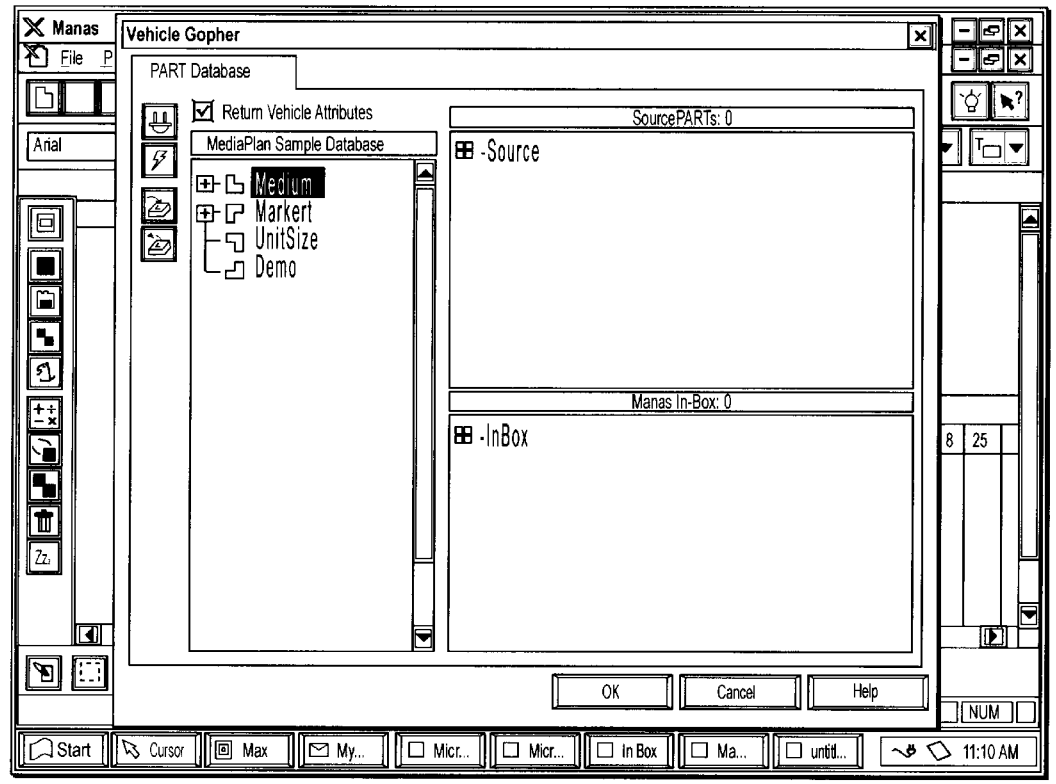
Figure 12A:
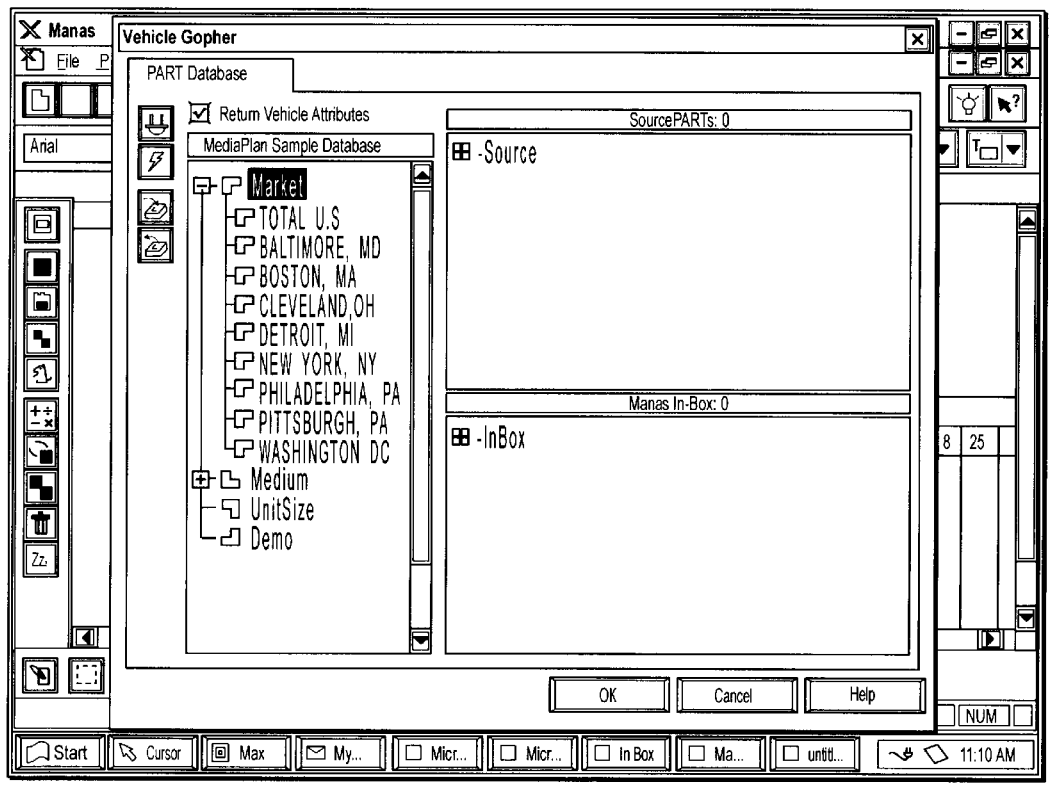
Figure 12B:
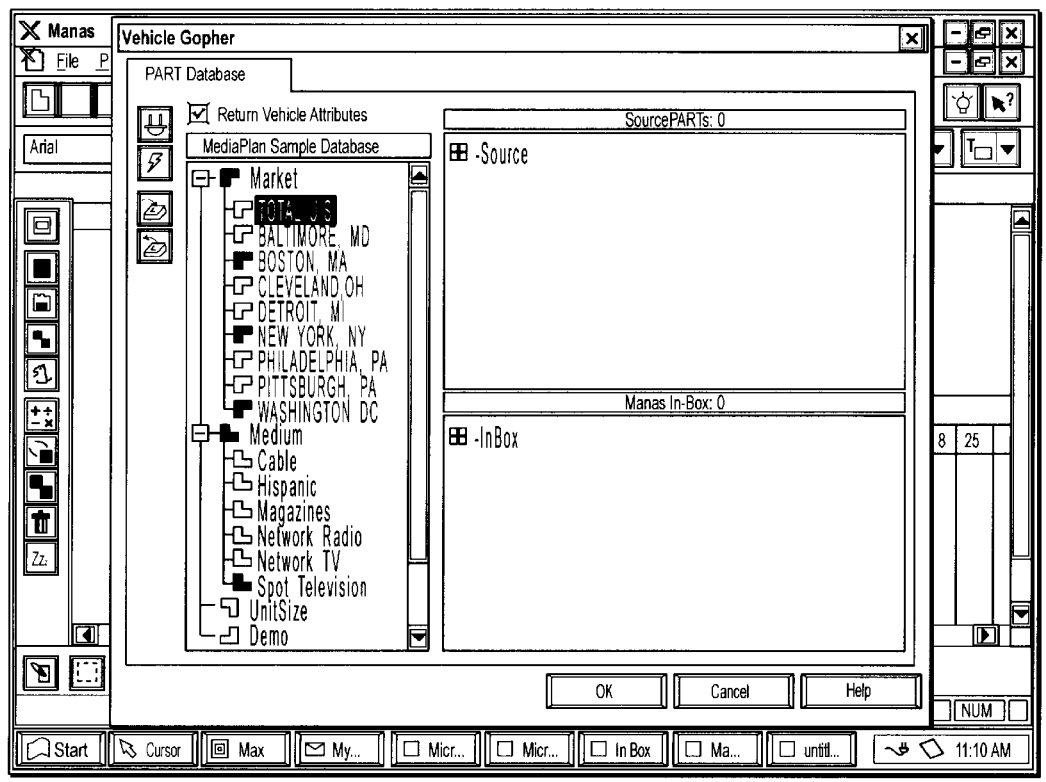
Figure 13A:
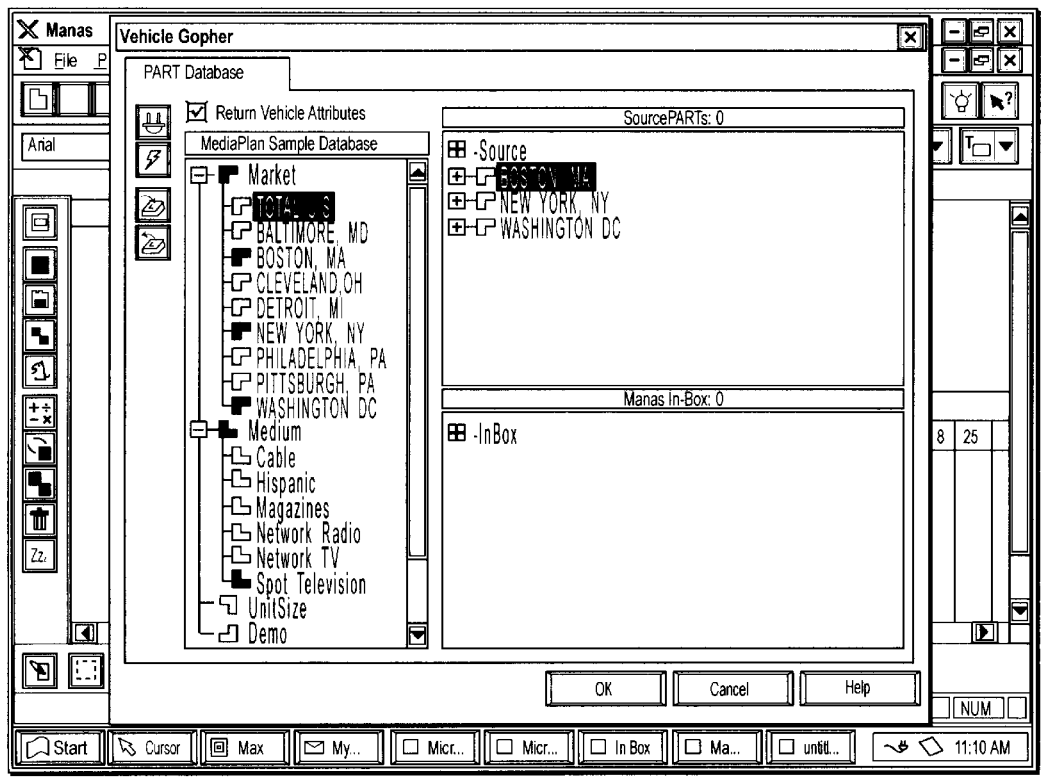
Figure 13B:
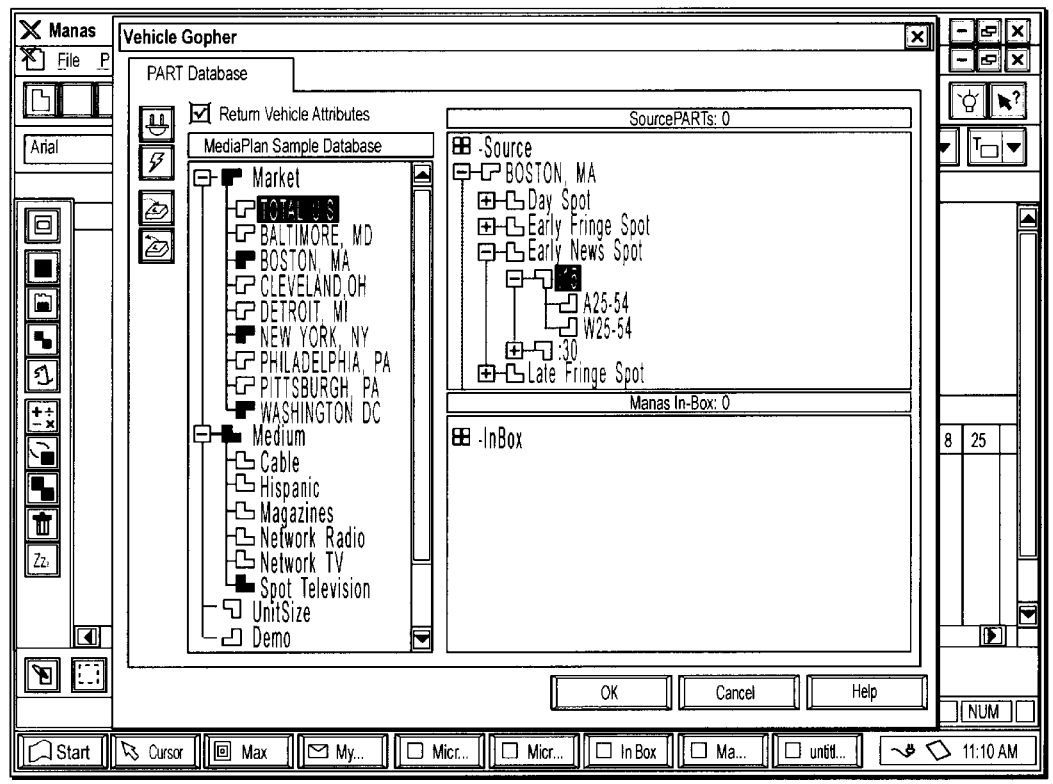
Figure 14:
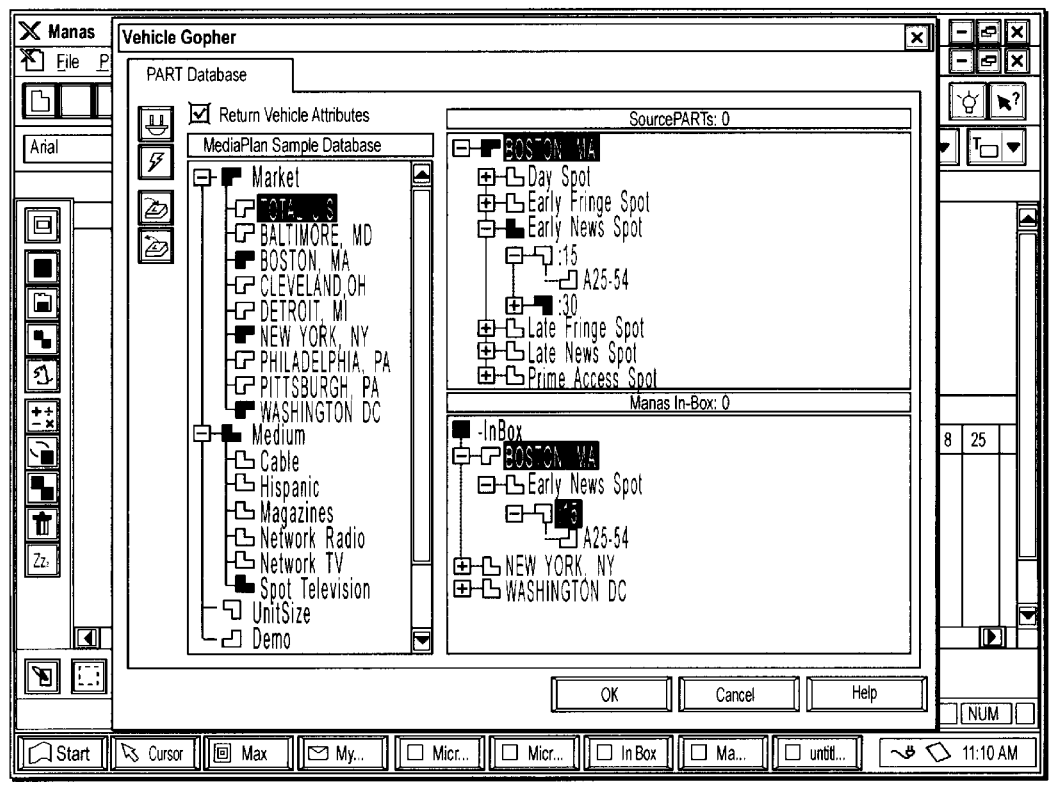
Figure 15:
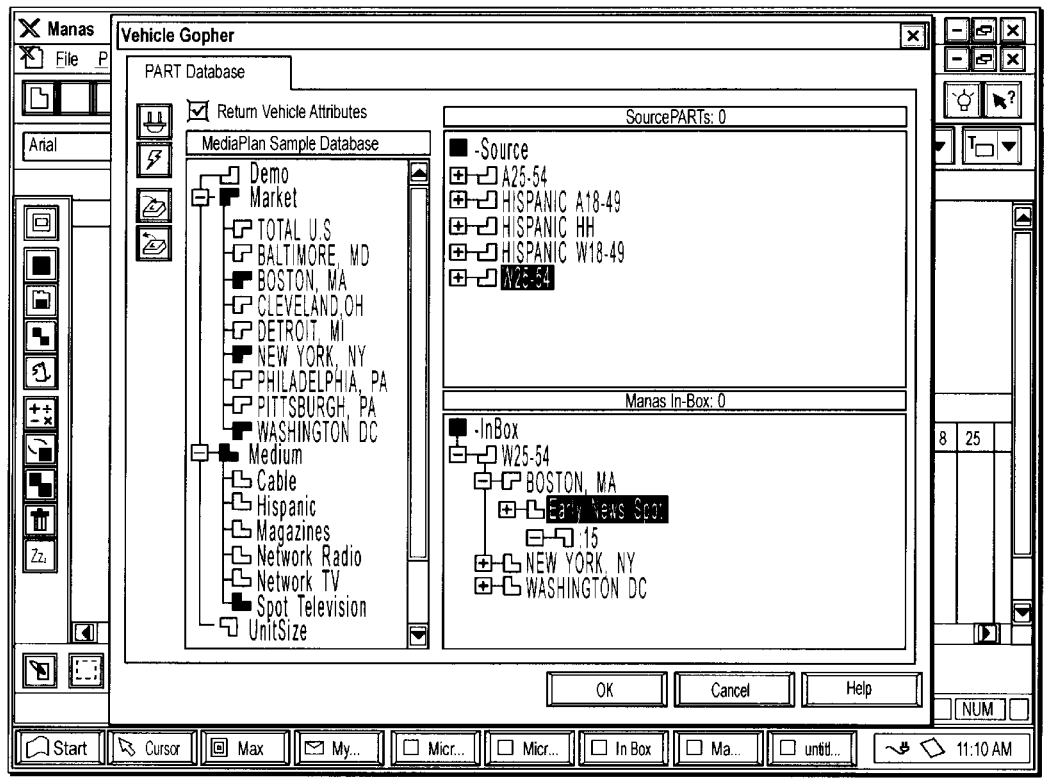
Figure 16:
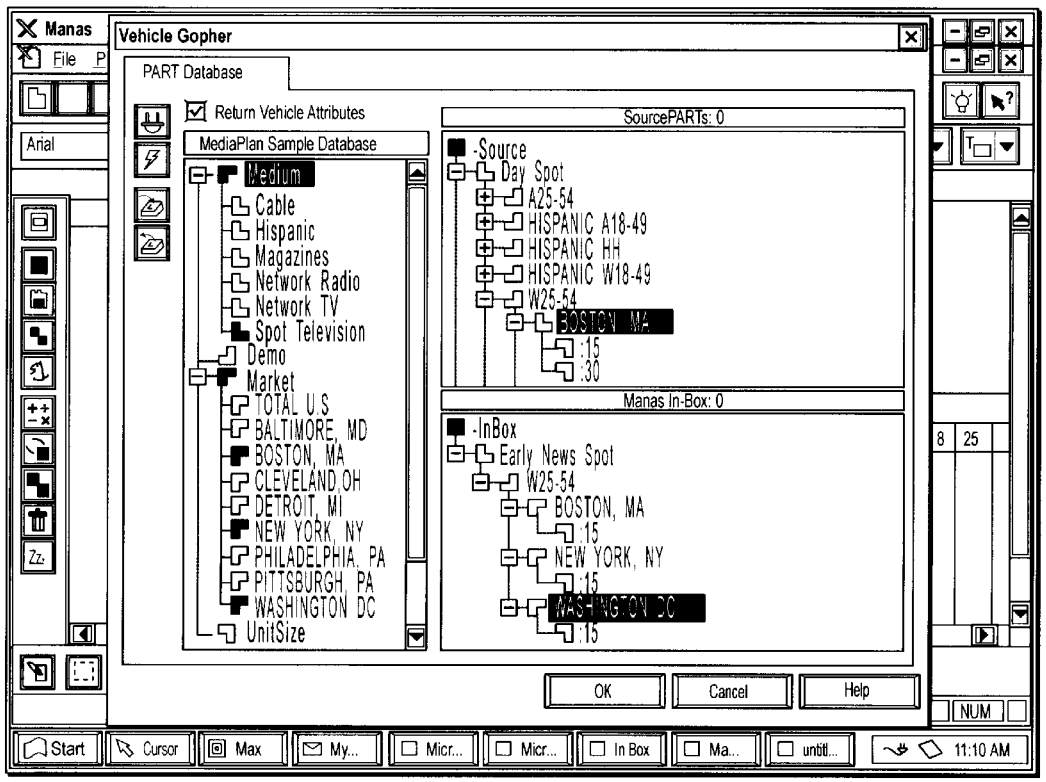
Figure 17:
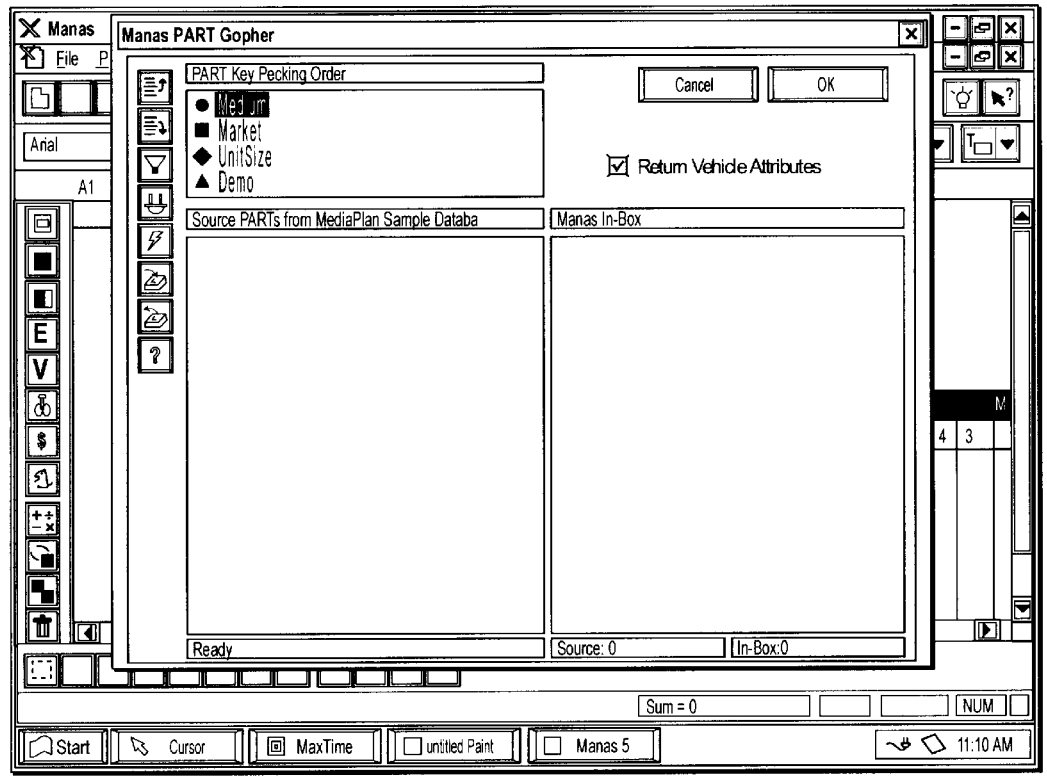
FIGS. 17–22 are screen shots forming Example B that illustrate various aspects of operation of the present invention using a particular user interface.
Figure 18A:
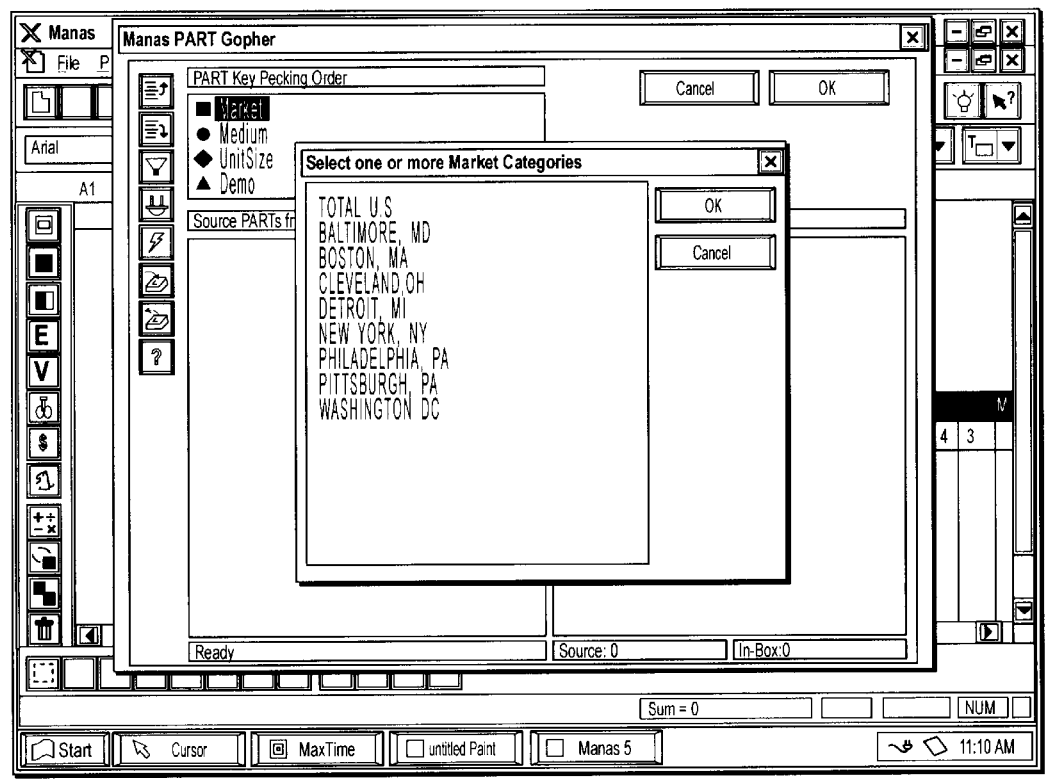
Figure 18B:
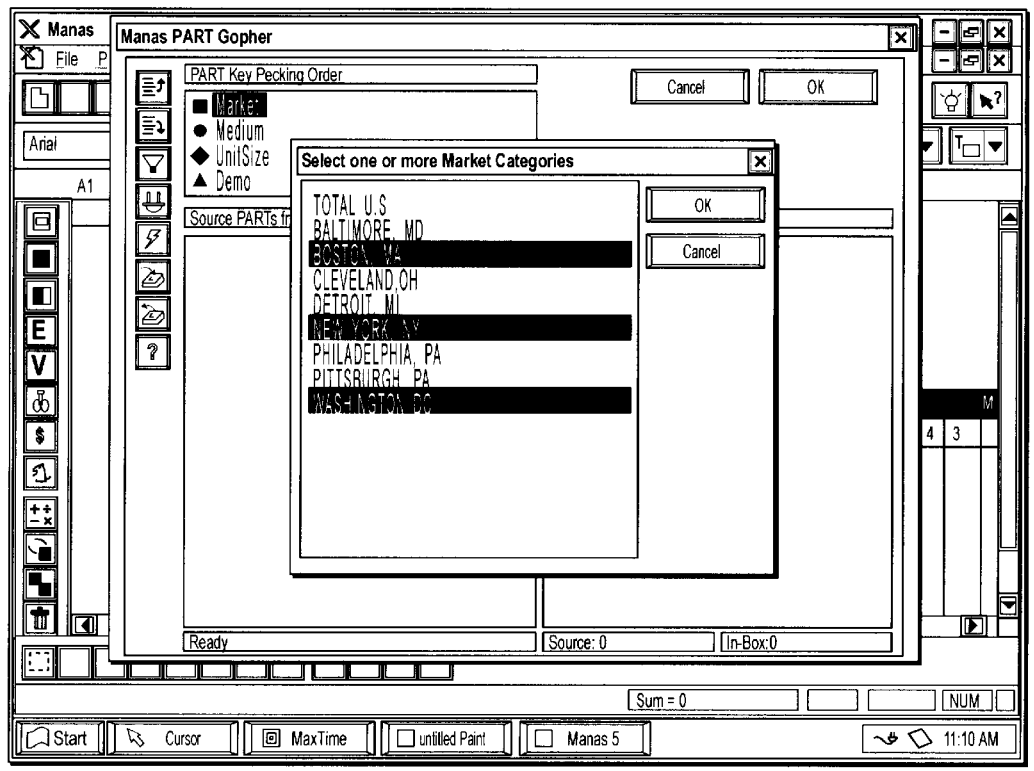
Figure 18C:
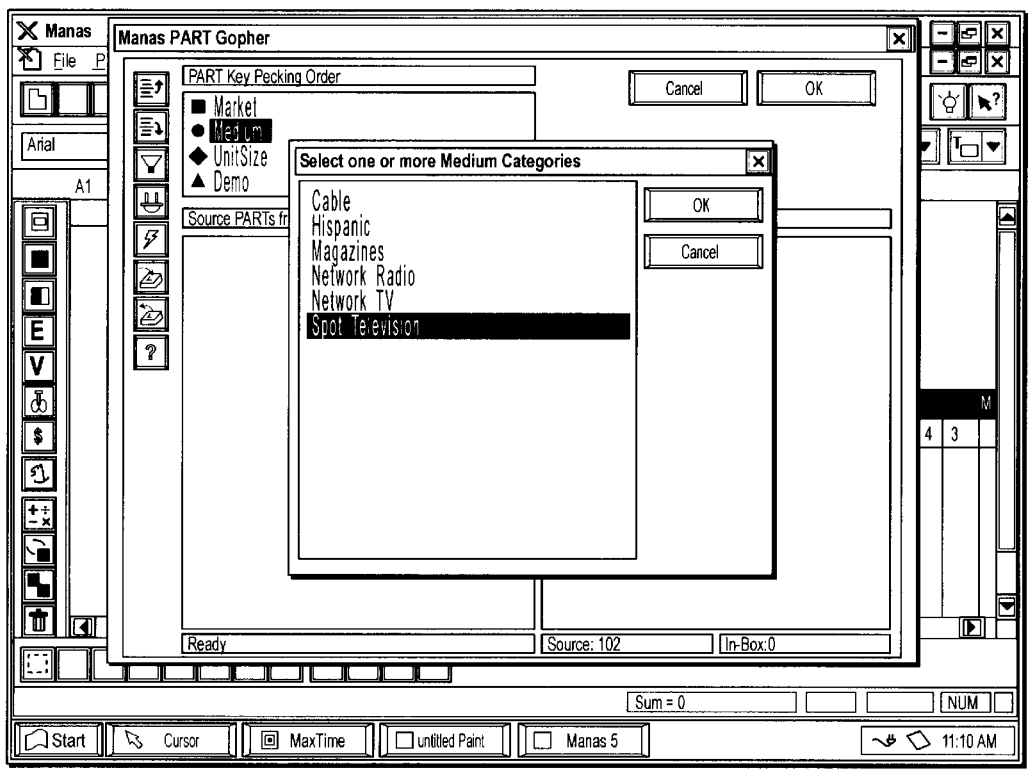
Figure 19A:
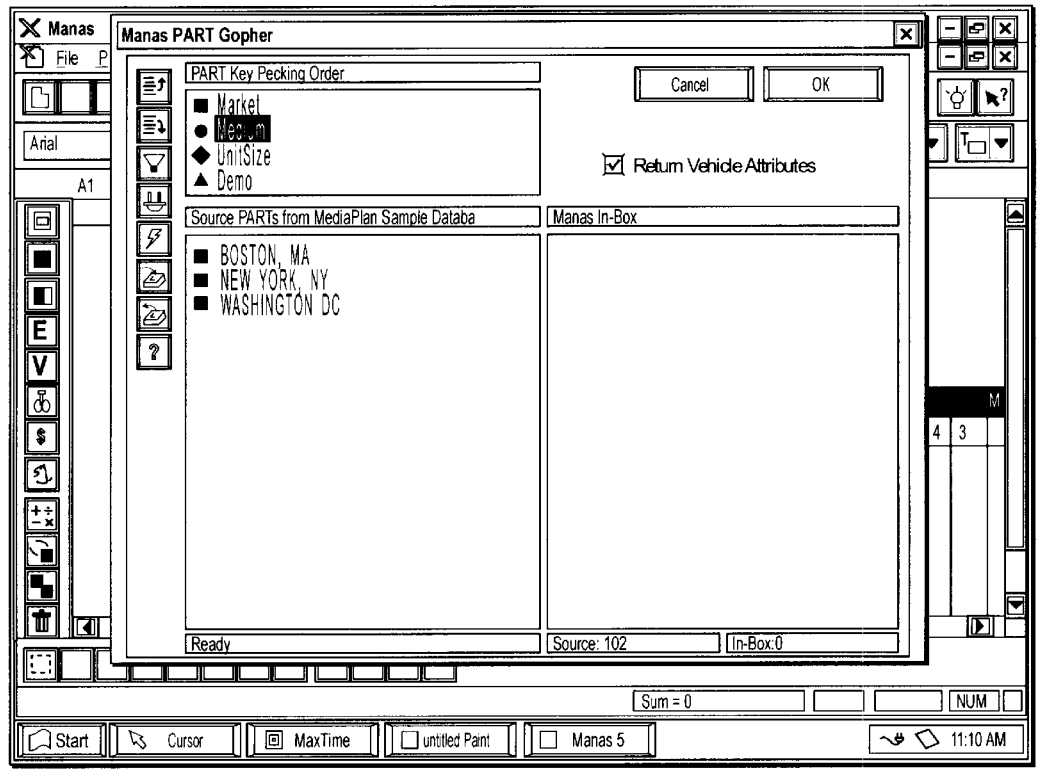
Figure 19B:
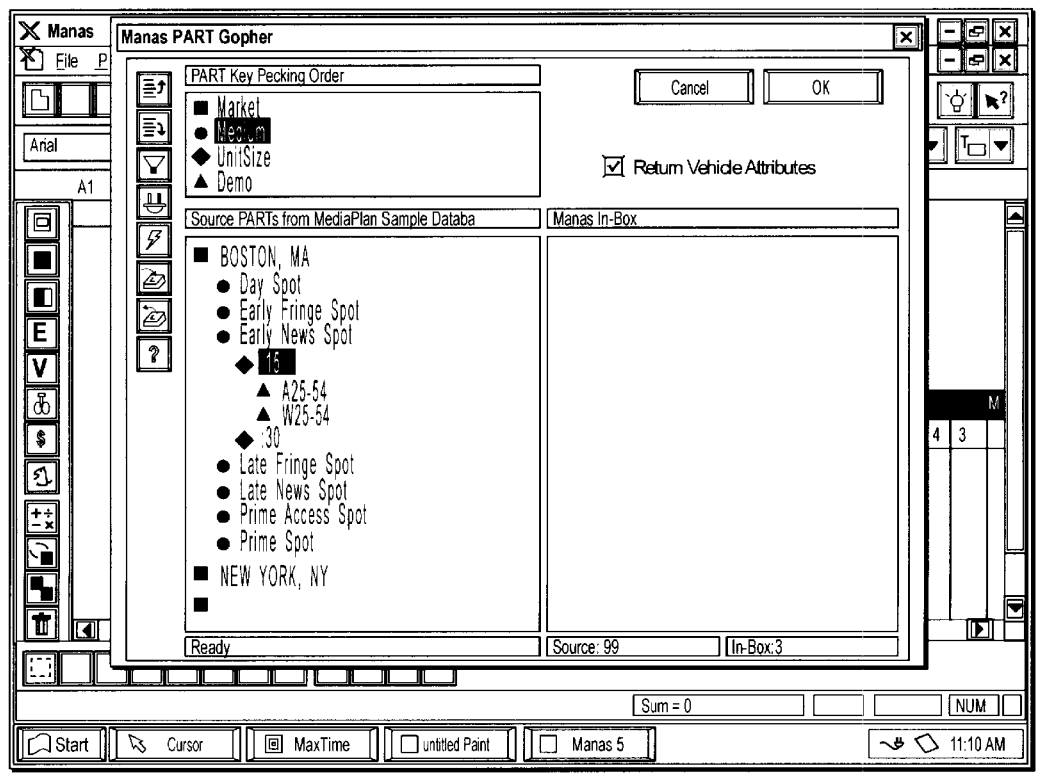
Figure 20:
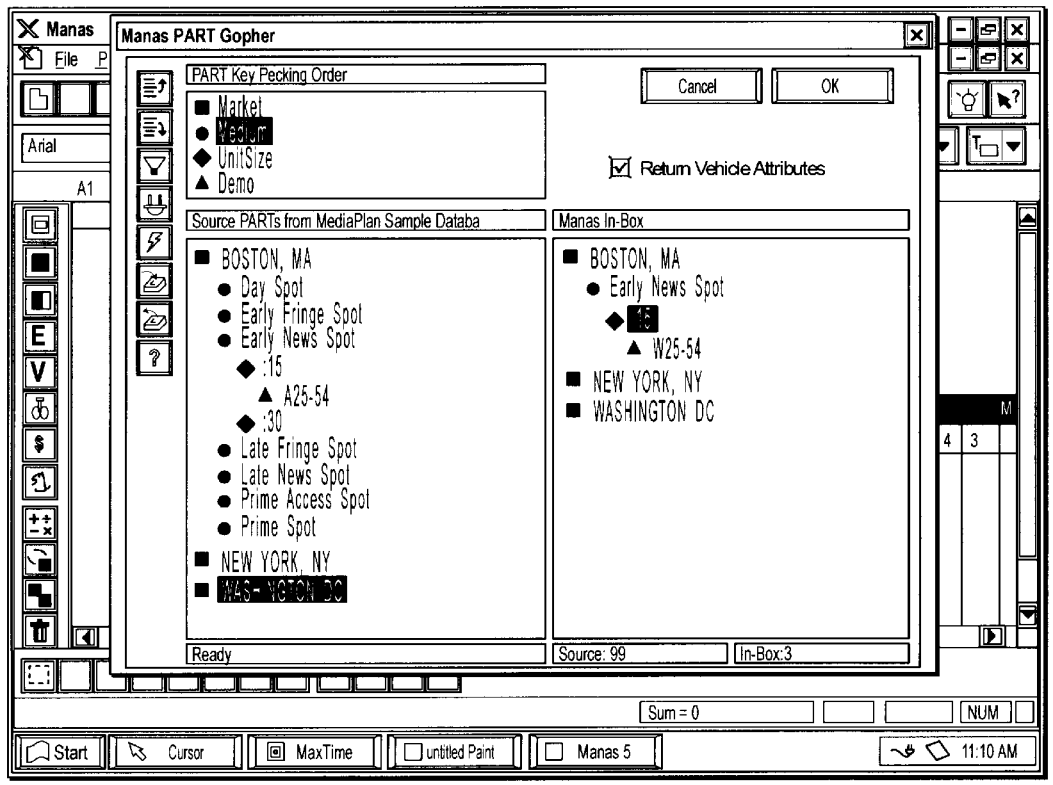
Figure 21:
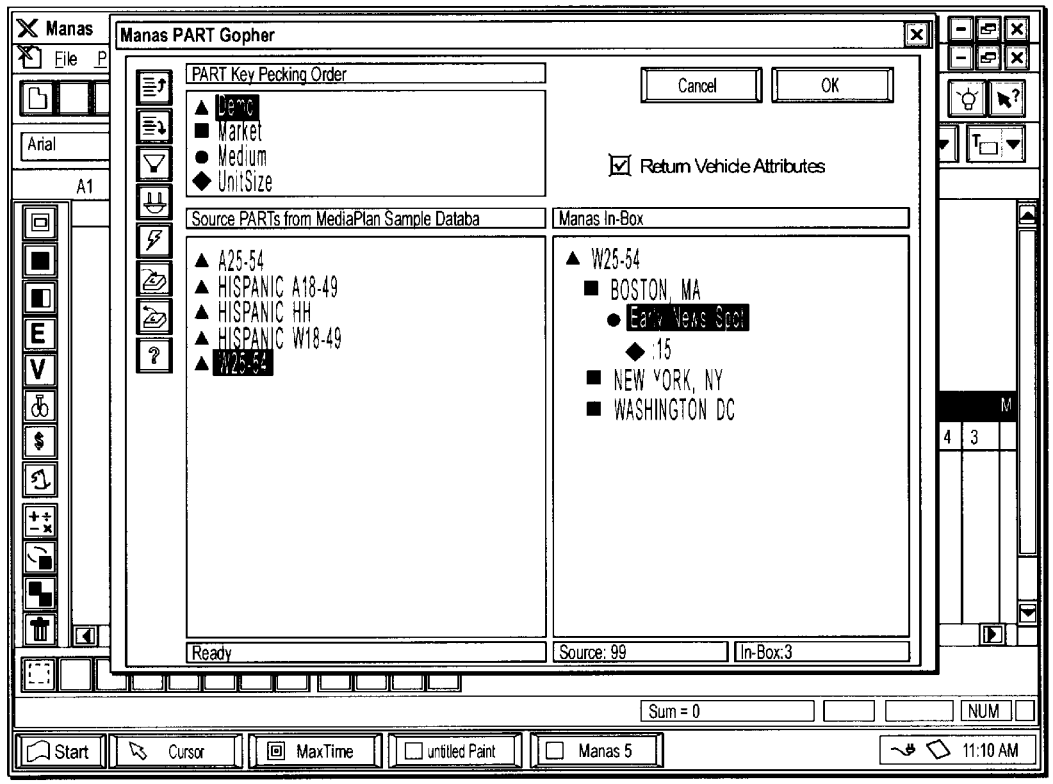
Figure 22:
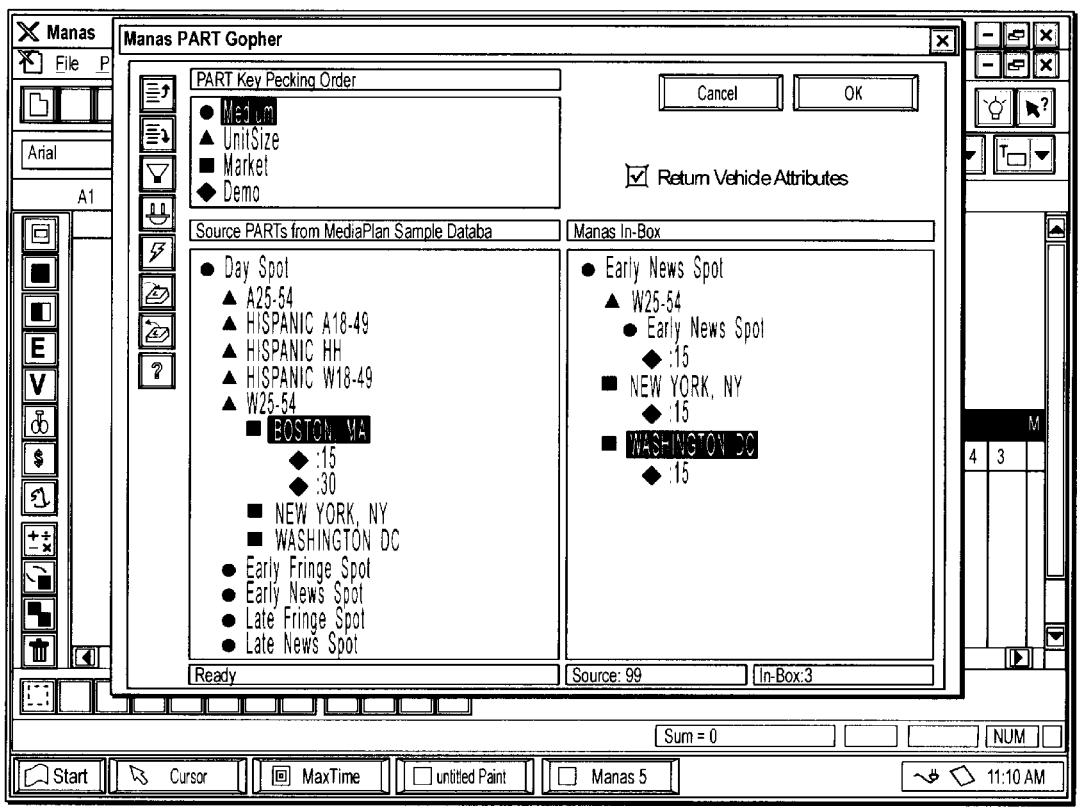

FIG. 8 shows operation of the control interface 124c to select a certain subset of all the potential values for particular categorization levels in order to "filter" through the many records potentially available in order to narrow down to fewer records for the reorienting categorization table use for actually selecting records. The desired selection categorization hierarchy was established as shown in FIG. 7 and the control interface of 124c of FIG. 8 indicates that the market categorization level and the medium categorization level can be expanded to show subsets thereof. A corresponding screen shot of an actual implementation is shown in FIG. 11 for Example A and FIG. 17 for Example B.

Referring now to FIG. 8, the record categorization levels as shown in the control interface 124c are expanded and certain subcategories are chosen as indicated by the dashed boxes. Only those values will be used as actual selection categorization table headings. Once the potential category level values are selected as shown in the control interface 124c a query is made to the data base as represented by arrow 130 so that a portion of all the PART records are retrieved in order to build the selection categorization table 126a. The expansion, and display, and selection of the potential category levels are shown for Example A in FIG. 12 and for Example B in FIG. 18.

The selection categorization table 126a will encompass fewer records then the record categorization level shown in the control interface 124c to thereby filter to a manageable number of fewer records for selection in the selection categorization table 126a. The selected records are marked directly by a dashed box and those headings and subheadings containing selected records are shown with cross-hatching in the selection categorization table 126a. See FIG. 13 for Example A and FIG. 19 for Example B.

Figure 9:
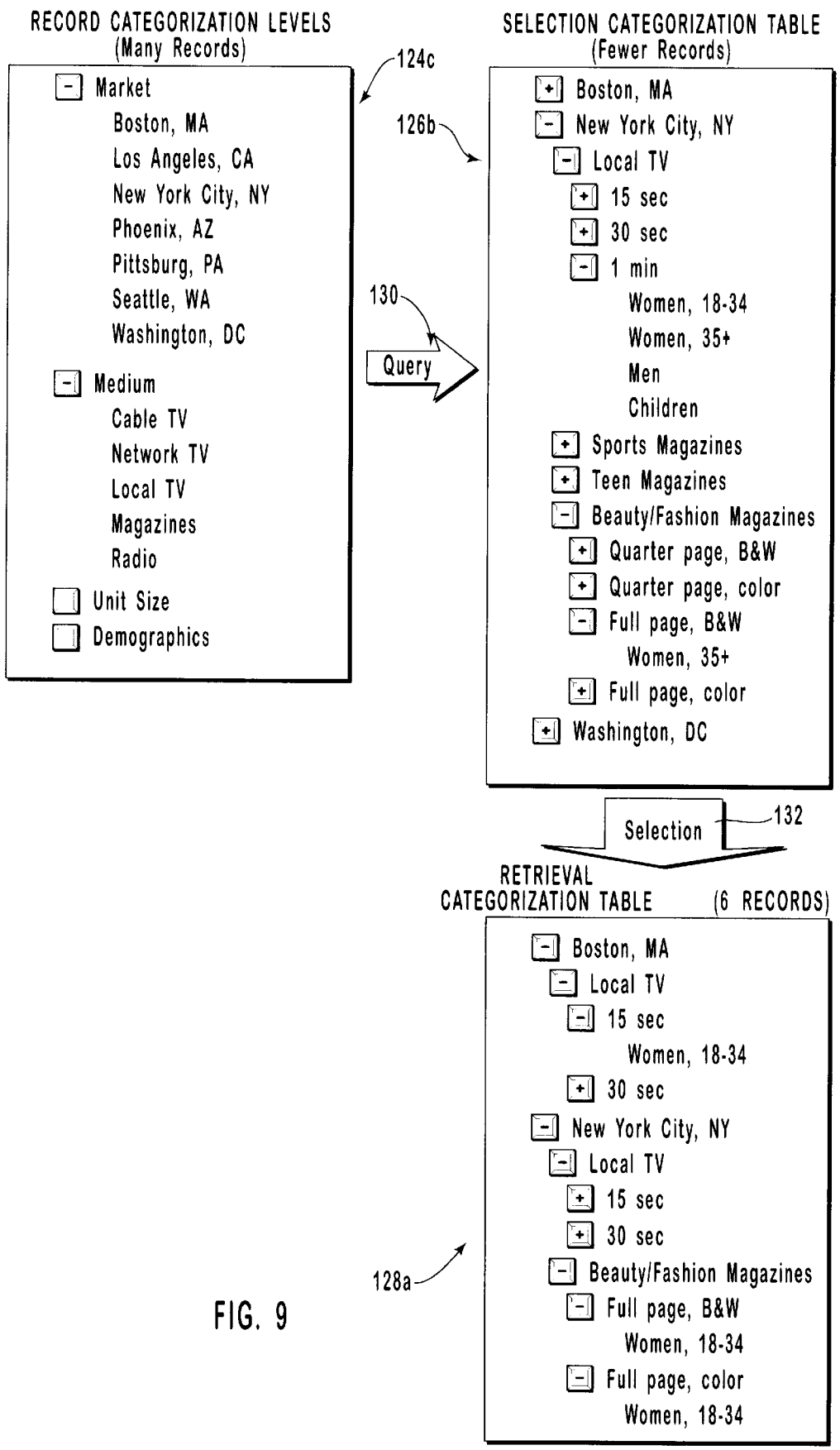

Referring now to FIG. 9, a retrieval categorization table 128a is created from the selected records in the selection categorization table 128a of FIG. 8. This selection is represented by the arrow 132 and allows a user to visually see and sort through those records that have been selected for eventual retrieval and processing by a program. When records are selected and placed into the retrieval categorization table 128a, they are removed from the selection categorization table 126b of FIG. 9. In this manner, information representing each record that met the query requirements will be in either selection categorization table 126b or the retrieval categorization table 128a. Furthermore, a user may send records back to the selection categorization table from the retrieval categorization table 128a. This allows a user to iteratively process and gather the records desired for eventual retrieval in their entirety from the database or for otherwise processing those records. See page FIG. 14 for Example A and FIG. 20 for Example B showing sample screen shots illustrating the retrieval categorization table.

Referring now to FIG. 10, the results of the changing of the categorization hierarchy level is shown. The control interface 124d shows the demographics promoted from the bottom level to the uppermost level. This in turn causes the selection categorization table 126c and the retrieval categorization table 128b to reorient themselves based on the categorization level hierarchy as indicated in the control interface 124d. This provides a completely different view into the respective group of data records and allows a user friendly way to manipulate records between the selection categorization table 126c and the retrieval categorization 128b. For example, a number of records may be selected from the selection categorization table 126c and brought to the retrieval categorization table 128b. Then, the control interface 124d may be used to reorient the selection categorization table 126c and the retrieval categorization table 128b in order to facilitate "deselecting" records or sending records back to the selection categorization table 126c from the retrieval categorization table 128b. The differing views allow data records to be manipulated in an efficient manner to enable a user to more quickly arrive at a set of records in the retrieval categorization table 128b that are desired for processing. Those who become skilled at manipulating the different levels and views into the data will more thoroughly benefit from this form of database browser. Two forms of reorientation are shown: for Example A in FIGS. 15–16 and for Example B in FIGS. 21–22.

Referring now to FIG. 11, a flow chart is shown illustrating the steps taken in order to access records and do a reorientation. It is shown as a simple linear process for illustration purposes only and as can be seen by the previous explanation in connection with FIGS. 7–10 the process may be iterative between certain steps.

Beginning at step 134, the database is first accessed at step 136. The database access allows the browser to make connection with the database and to query the database for the different categorization levels possible with any accompanying sub-categorizations that may be necessary. In one known embodiment of such a browser, an SQL database is used wherein the database assigns certain data fields to a known "alias" to thereby allow the browser access to given data fields in a way that can be controlled by the database designer or maintainer. Once accessed, the category levels are displayed at step 138 allowing the user to visualize the different category levels and a current hierarchy.

Next, the category level hierarchy is selected by the user using the control interface at step 140 to thereby signal the nature of the subsequent categorization table to be displayed. Easy hierarchy designation allows a convenient mechanism for a user to customize the categorization table.

Category level subheadings may be chosen, if available, at step 142 in order to filter the records when creating the selection categorization table. This allows the selection categorization table to have smaller number of records represented therein and be more focused in order to make the process of maneuvering through the selection categorization table less burdensome and more efficient.

The database is queried at step 144 for information representing the data records, typically portions of data records, in order to create the selection categorization table. This query will include sorting the data records information according to the categorization level hierarchy and filtering the data records information by constraining the potential headings and subheadings to values selected previously through the control interface.

The categorization table is ordered and created at step 146 according to the selected hierarchy. A method for achieving such creation was discussed previously in connection with FIG. 6.

At step 148, the selection categorization table is displayed and may be manipulated through the user interface by a user. The user will expand and collapse headings and subheadings as appropriate in order to find those data items suitable for selection. Selection will typically occur by first marking the record through the user interface and then causing the record to be placed into a specific retrieval categorization table at step 150.

Furthermore, records may be switched back and forth between the selection categorization table and the retrieval categorization table according to the user's desires by using the user interface. This is a very helpful process since entire subtrees of records may be selected and placed into the retrieval categorization table and then those that are not desired can be individually selected and placed back into the selection categorization table. Additionally, using the control interface to reorient the selection categorization table and the retrieval categorization table allows different views into the record so that increasingly efficient methods of arriving at the final set of records for retrieval may be attained.

Once the user, through using the interface of the browser, has determined the entire set of records for retrieval, those records, and those records only, are retrieved for processing at step 152. At this point, only those records that will actually be processed are accessed thereby saving communication overhead by avoiding the retrieval of an excessive complete data records and saving processing time by only processing desired records. Finally, an end point is reached at step 154.

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A method for reorienting and displaying a categorization table having N different categorization levels, the categorization table categorizing a quantity of data records having data record fields, using values of each of the N categorization levels to form category headings for that particular level, and capable of being expanded or collapsed for each respective heading at each respective level, the method comprising the steps of:

displaying N categorization levels, each categorization level corresponding to a data record field;

forming a hierarchal order of the N categorization levels in response to a user selection, the user having created the hierarchal order from amongst potential hierarchal orderings;

displaying a reoriented categorization table into the quantity of data records wherein the N different categorization levels are arranged in the hierarchal order previously chosen and the category headings for each different level are made up of each of the different possible field values for the field corresponding to that particular level thereby reorienting the categorization table using the N categorization levels in response to the user selection of the hierarchal order of the N categorization levels.

2. A method for accessing information in a database by displaying a reorienting categorization table having N different categorization levels, the categorization table categorizing a quantity of data records having data record fields, using values of of the N each categorization levels to form category headings for that particular level, and capable of being expanded or collapsed for each respective heading at each respective level, the method comprising the steps of:

establishing connection with the database of data records;

accessing N categorization levels from the database, each categorization level corresponding to a data record field, having a title, and optionally having a set of one or more category groups of one or more unique values, each unique value corresponding to a unique data field value;

displaying the N categorization level titles along with the set of category groups associated with each categorization level;

forming a hierarchal order of the N categorization levels in response to a user selection, the user having created the hierarchal order from amongst potential hierarchal orderings;

filtering the N categorization levels to determine the categorization level values for each of the N categorization levels in response to the user selection, the user also selecting at least one of the category groups associated with each categorization level;

accessing from the database the unique values associated with each categorization level; and displaying a categorization table into the quantity of filtered data records wherein the N different categorization levels are arranged in the hierarchal order previously chosen and the category headings for each different level are made up of the previously selected unique values corresponding to that particular level.

3. The method as recited in claim 2 further comprising the steps of:

selecting which actual data records to retrieve from the database in response to user selection; and retrieving from the database the previously selected data records.

4. The method as recited in claim 3 further comprising the step of creating a second categorization table for organizing the data records previously selected for retrieval, the second categorization table responsive to the hierarchal ordering of the N different categorization levels previously chosen.

5. A computer program product comprising:

a computer usable medium;

computer readable program code means embodied in said medium for reorienting and displaying a categorization table having N different categorization levels, the categorization table categorizing a quantity of data records having data record fields, using values of each of the N categorization levels to form category headings for that particular level, and capable of being expanded or collapsed for each respective heading at each respective level, said computer readable program code means comprising;

means for displaying N categorization levels, each categorization level corresponding to a data record field;

means for forming a hierarchal order of the N categorization levels in response to a user selection, the user having created the hierarchal order from amongst potential hierarchal orderings;

means for displaying a reoriented categorization table into the quantity of data records wherein the N different categorization levels are arranged in the hierarchal order previously chosen and the category headings for each different level are made up of each of the different possible field values for the field corresponding to that particular level thereby reorienting the categorization table using the N categorization levels in response to the user selection of the hierarchal order of the N categorization levels.

6. A computer program product comprising:

a computer usable medium;

computer readable program code means embodied in said medium for accessing information in a database by displaying a reorienting categorization table having N different categorization levels, the categorization table categorizing a quantity of data records having data record fields, using values of each of the N categorization levels to form category headings for that particular level, and capable of being expanded or collapsed for each respective heading at each respective level, said computer readable program code means comprising;

means for establishing connection with the database of data records;

means for accessing N categorization levels from the database, each categorization level corresponding to a data record field, having a title, and optionally having a set of one or more category groups of one or more unique values, each unique value corresponding to a unique data field value;

means for displaying the N categorization level titles along with the set of category groups associated with each categorization level;

means for forming a hierarchal order of the N categorization levels in response to a user selection, the user having created the hierarchal order from amongst potential hierarchal orderings;

means for filtering the N categorization levels to determine the categorization level values for each of the N categorization levels in response to the user selection, the user also selecting at least one of the category groups associated with each categorization level;

means for accessing from the database the unique values associated with each categorization level; and means for displaying a categorization table into the quantity of filtered data records wherein the N different categorization levels are arranged in the hierarchal order previously chosen and the category headings for each different level are made up of the previously selected unique values corresponding to that particular level.

7. A computer program product as recited in claim 6 wherein the computer program code means further comprises:

means for selecting which actual data records to retrieve from the database in response to user selection; and means for retrieving from the database the previously selected data records.

8. A computer program product as recited in claim 7 wherein the computer program code means further comprises means for creating a second categorization table for organizing the data records previously selected for retrieval, the second categorization table responsive to the hierarchal ordering of the N different categorization levels previously chosen.

9. In a computer system comprising a CPU, a display means controlled by the CPU, and an input means operated by a user connected to the CPU, a method for reorienting and displaying a categorization table having N different categorization levels, the categorization table categorizing a quantity of data records having data record fields, using values of each of the N categorization levels to form category headings for that particular level, and capable of being expanded or collapsed for each respective heading at each respective level, the method comprising the steps of:

the CPU displaying on the display means N categorization levels, each categorization level corresponding to a data record field;

the CPU forming a hierarchal order of the N categorization levels in response to a user selection through the input means, the user having created the hierarchal order from amongst potential hierarchal orderings;

the CPU displaying on the display means a reoriented categorization table into the quantity of data records wherein the N different categorization levels are arranged in the hierarchal order previously chosen and the category headings for each different level are made up of each of the different possible field values for the field corresponding to that particular level thereby reorienting the categorization table using the N categorization levels in response to the user selection through the input means to arrange the hierarchal order of the N categorization levels.

10. In a computer system comprising a CPU, a display means controlled by the CPU, and an input means operated by a user connected to the CPU, a method for accessing information in a database by displaying a reorienting categorization table having N different categorization levels, the categorization table categorizing a quantity of data records having data record fields, using values of each of the N categorization levels to form category headings for that particular level, and capable of being expanded or collapsed for each respective heading at each respective level, the method comprising the steps of:

the CPU establishing connection with the database of data records;

the CPU accessing N categorization levels from the database, each categorization level corresponding to a data record field, having a title, and optionally having a set of one or more category groups of one or more unique values, each unique value corresponding to a unique data field value;

the CPU displaying on the display means the N categorization level titles along with the set of category groups associated with each categorization level;

the CPU forming a hierarchal order of the N categorization levels in response to a user selection through the input means, the user having created the hierarchal order from amongst potential hierarchal orderings;

the CPU filtering the N categorization levels to determine the categorization level values for each of the N categorization levels in response to the user selection through the input means, the user also selecting at least one of the category groups associated with each categorization level;

the CPU accessing from the database the unique values associated with each categorization level; and the CPU displaying on the display means a categorization table into the quantity of filtered data records wherein the N different categorization levels are arranged in the hierarchal order previously chosen and the category headings for each different level are made up of the previously selected unique values corresponding to that particular level.

11. The method as recited in claim 10 further comprising the steps of:

the CPU determining which actual data records to retrieve from the database in response to user selection through the input means; and the CPU retrieving from the database the previously selected data records.

12. The method as recited in claim 11 further comprising the step of the CPU creating and displaying on the display means a second categorization table for organizing the data records previously selected for retrieval, the second categorization table responsive to the hierarchal ordering of the N different categorization levels previously chosen.

* * * * *

UNITED STATES PATENT AND TRADEMARK OFFICE
CERTIFICATE OF CORRECTION

PATENT NO. : 5,842,218

DATED : Nov. 24, 1998

INVENTOR(S) : Marke James Robinson

It is certified that error appears in the above-identified patent and that said Letters Patent is hereby corrected as shown below:

Col. 1, line 29, after "and" change "it's" to --its--

Col. 2, line 39, after "number" delete the second occurrence of "than the"

Col. 2, line 48, after "can" insert --be--

Col. 3, line 24, after "or" change "maybe" to --may be--

Col. 3, line 55, before "embodiment" change "On" to --One--

Col. 4, line 15, after "automatically" change "occur" to --occurring--

Col. 5, line 18, after "records" change "then" to --than--

Col. 5, line 19, after "to a" change ""filtering"election" to --"filtering" selection--

Col. 5, line 56, after "through" change "1" to --/--

Col. 5, lines 65 and 66, after "to" change "m" to --$m$--

Col. 6, line 4, after "to" change "n" to --$n$--

Col. 6, line 38, after "by arrow" change "24" to --30--

Col. 6, line 60, after "steps" delete --for--

Col. 7, lines 9, 23, and 28, change "resorted" to --re-sorted--

UNITED STATES PATENT AND TRADEMARK OFFICE
CERTIFICATE OF CORRECTION

PATENT NO. : 5,842,218
DATED : Nov. 24, 1998
INVENTOR(S) : Marke James Robinson

It is certified that error appears in the above-identified patent and that said Letters Patent is hereby corrected as shown below:

Col. 7, lines 10 and 20, change "resorting" to --re-sorting--

Col. 7, line 66, after "with it" change "3" to --a--

Col. 8, line 44, after "for" change "displays" change --displaying--

Col. 10, line 8, after "predefined" change "alias" to --alias'--

Col. 13, line 27, after "values" delete the second occurrence of "of"

Signed and Sealed this

Fourth Day of January, 2000

Attest:

Attesting Officer

Acting Commissioner of Patents and Trademarks